(12) United States Patent
Surisetty et al.

(10) Patent No.: US 11,921,604 B2
(45) Date of Patent: Mar. 5, 2024

(54) EVALUATING SYSTEM RECOVERY USING EMULATED PRODUCTION SYSTEMS

(71) Applicant: Red Hat, Inc., Raleigh, NC (US)

(72) Inventors: Pradeep Kumar Surisetty, Apex, NC (US); Sai Sindhur Malleni, Leander, TX (US); Naga Ravi Chaitanya Elluri, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 42 days.

(21) Appl. No.: 17/512,891

(22) Filed: Oct. 28, 2021

(65) Prior Publication Data
US 2023/0135825 A1 May 4, 2023

(51) Int. Cl.
| | | |
|---|---|---|
| G06F 11/00 | (2006.01) | |
| G06F 11/07 | (2006.01) | |
| G06F 11/14 | (2006.01) | |
| G06F 11/30 | (2006.01) | |
| G06F 11/34 | (2006.01) | |

(52) U.S. Cl.
CPC ...... *G06F 11/3409* (2013.01); *G06F 11/0775* (2013.01); *G06F 11/142* (2013.01); *G06F 11/3051* (2013.01); *G06F 11/3072* (2013.01); *G06F 11/3466* (2013.01)

(58) Field of Classification Search
CPC .............. G06F 11/0775; G06F 11/142; G06F 11/3051; G06F 11/3072; G06F 11/3409; G06F 11/3466
See application file for complete search history.

(56) References Cited

U.S. PATENT DOCUMENTS

| | | | |
|---|---|---|---|
| 10,372,572 B1 * | 8/2019 | Kesarwani | G06F 11/261 |
| 10,684,940 B1 | 6/2020 | Kayal et al. | |
| 11,080,157 B1 * | 8/2021 | Roberts | H04L 41/14 |
| 11,323,348 B2 | 5/2022 | White | H04L 43/0823 |
| 11,397,665 B2 * | 7/2022 | Singh | G06F 11/3664 |
| 11,435,998 B2 * | 9/2022 | Sampson | H04L 67/34 |
| 2011/0145795 A1 * | 6/2011 | Khanapurkar | G06F 11/3466 717/126 |
| 2013/0275518 A1 * | 10/2013 | Tseitlin | G06F 11/263 709/206 |

(Continued)

OTHER PUBLICATIONS

Cotroneo et al., "Dependability Evaluation of Middleware Technology for Large-scale Distributed Caching", 2020, 11 pages.

*Primary Examiner* — Elmira Mehrmanesh
(74) *Attorney, Agent, or Firm* — Lowenstein Sandler LLP

(57) ABSTRACT

The technology disclosed herein can be used to evaluate system recovery using emulated production systems. In accordance with one example, the technology can involve accessing state data of a target computing device that is in a production environment, the state data can include a performance measurement of a target computing device; updating a configuration of a computing device to adjust a performance of the computing device to correspond to the performance measurement of the target computing device; introduce, by the processing device, a disturbance to the computing device; determining, by the processing device, a performance of the computing device at a time after the introducing the disturbance; and generating performance data indicating an effect the disturbance has on the computing device.

20 Claims, 7 Drawing Sheets

(56) References Cited

U.S. PATENT DOCUMENTS

| | | |
|---|---|---|
| 2016/0011952 A1* | 1/2016 | Tejerina .................. G06F 11/30 |
| | | 714/41 |
| 2017/0242784 A1 | 8/2017 | Heorhiadi et al. |
| 2018/0060202 A1 | 3/2018 | Papak et al. |
| 2019/0266072 A1* | 8/2019 | Ge ........................ H04L 41/145 |
| 2019/0354454 A1* | 11/2019 | Shmouely ............. G06F 11/261 |
| 2020/0174915 A1* | 6/2020 | Reeve ..................... G06F 17/17 |
| 2020/0226222 A1* | 7/2020 | Jayaraman ............. G06F 30/20 |
| 2021/0173767 A1* | 6/2021 | Zhang ................... G06F 16/211 |
| 2021/0191845 A1* | 6/2021 | Bach ................... G06F 11/3684 |
| 2022/0188218 A1* | 6/2022 | Abrams ................ G06F 11/368 |

* cited by examiner

EVALUATING SYSTEM RECOVERY USING EMULATED PRODUCTION SYSTEMS

TECHNICAL FIELD

Embodiments of the disclosure relate generally to testing computer systems, and more specifically, relates to evaluating the performance of the computer system as it recovers from failures.

BACKGROUND

Modern computer systems process data for long periods of time and occasionally encounter failures. The computer systems are typically designed to be failure resilient and to recover from the failures in the absence of user assistance or with minimal user assistance. The performance of the system may be adversely affected by the failure and may or may not fully recover.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
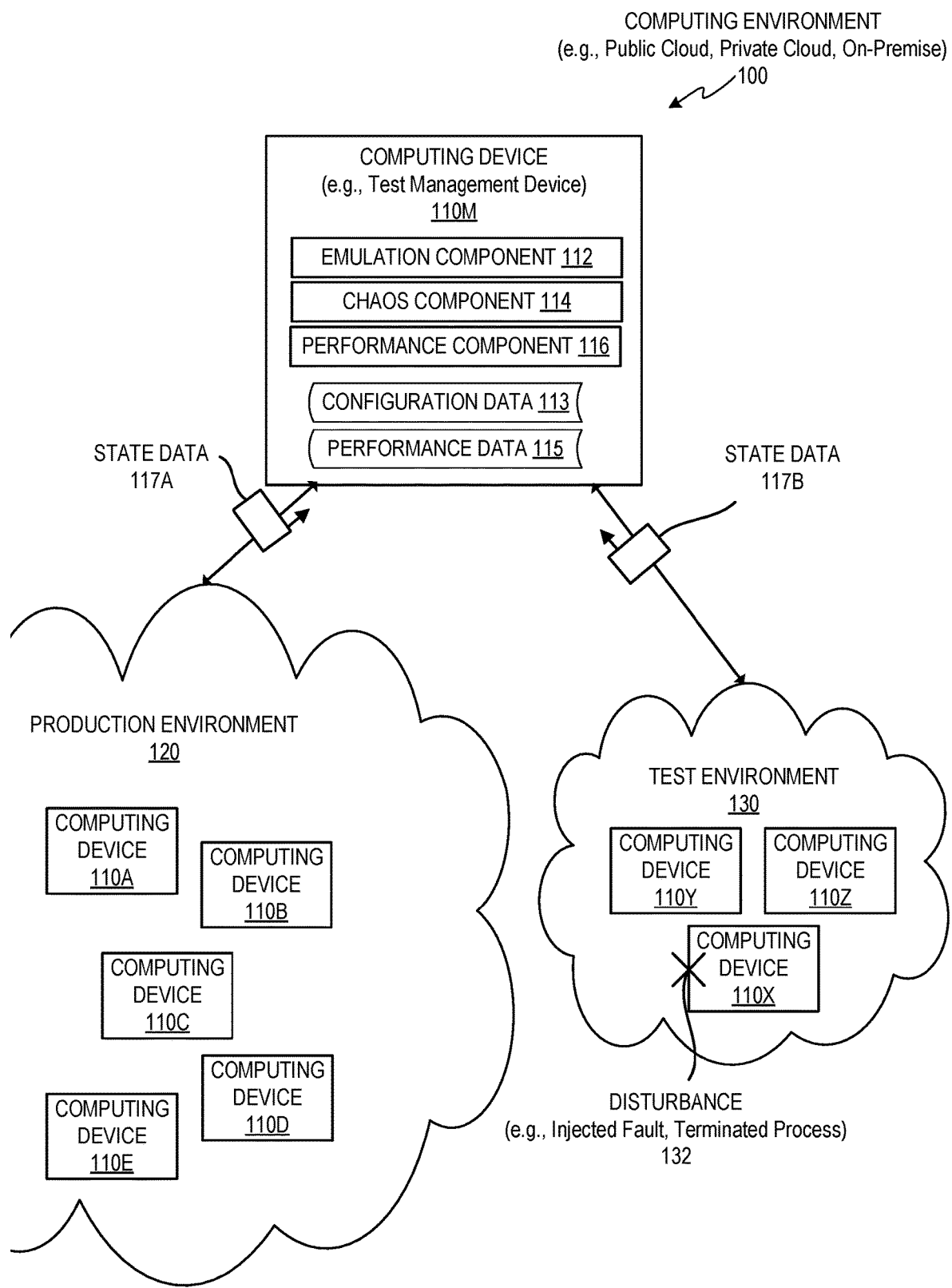
FIG. 1 illustrates an example computing environment that includes a production environment and a test environment and technology for testing system recovery using emulated production systems, in accordance with some embodiments of the present disclosure.

Computing devices that are deployed in a production environment are often designed to recover quickly from a variety of different failure scenarios to reduce the effects on the rest of the production environment. System designers often test these scenarios in a test environment to ensure the computing devices are able to recover correctly, often generalized as resiliency. More recently, system designers have begun testing on computing devices while they are in the production environment. This has developed into a discipline referred to as chaos engineering and includes a well know product called Chaos Monkey® that was developed by Netflix®. Chaos Monkey intentionally causes portions of a production systems to fail in order to build confidence in the capability of the production system to withstand failures. Chaos engineering introduces the failures into the production environment, as opposed to the test environment, because the production environment experiences a more challenging workload. The workload (e.g., production workload) is typically much larger, more complex, and runs for much longer that a test workload and can make recovery more challenging. Chaos engineering adds chaos to a system by intentionally causing failures and this is typically discouraged my most system administrators. This is because causing failures adversely affects the performance of the production environment and even though in ideal situations it will have a minimum effect there are some situations in which it will have a much larger effect (e.g., catastrophic affect).

Aspects of the present disclosure address the above and other deficiencies by including technology to test and evaluate system recovery using an emulated production system. In one example, the technology can access state data of a set of one or more target computing devices in a production environment. The state data can represent the state of the production environment while the production environment is processing a workload. The state data can include configuration data (e.g., operating systems, programs, and devices), performance data (e.g., throughput, speed, response time, latency or other quality of service measurements), other data, or a combination thereof. The technology can use the state data to update a configuration of a set of one or more computing devices. The set of computing devices can be in a test environment, in a development environment, other environment, or a combination thereof. The technology may use the state data to determine how to configure the set of computing devices.

The technology can also update the configuration of the set of computing devices to emulate the target computing devices in the production environment. Updating the configuration of the computing devices can change the performance of the set. The technology can configure and load the set so that it performs similar to the set of computing devices in the production environment. The load can be based on the production load, a test load, a synthetic load, or a combination thereof. The technology can intentionally degrade the performance of the set of computing devices to emulate the computing devices in the production environment. For example, the production environment may be highly distributed and processing the production load may involve using a combination of remote resources. The technology can configure the set of computing devices to degrade the performance of local resources so that they emulate the performance of remote resources. This can involve modifying a configuration of a computing resource to alter a response time, bandwidth, speed, latency, data path, or other resource degradation. As discussed in more detail below, the technology can experiment with multiple different candidate configurations to find the configuration that most closely emulates the production environment. In one example, the technology may evaluate each of the candidate configurations and use feedback of a prior candidate configuration to determine the subsequent configuration.

The technology can then test the computing devices to avoid running tests that adversely affect the production environment. The tests can involve introducing a disturbance to the set of computing devices. The disturbance can be any change to the configured computing device or to something that affects the computing device (e.g., power failure, process termination, fault injection). The technology may also generate and store performance data that indicates the effect the disturbance has on the set of computing devices. The performance data can include one or more performance measurements from before, during, or after the disturbance and can represent how a particular computing device or the entire set of computing devices recover from one or more disturbances. The technology can analyze the performance data and use the performance data to select a different disturbance or a vary an attribute of the disturbance to use in future tests (e.g., modify duration, location, severity, or quantity of disturbances). In one example, the technology can generate a mathematical model that represents how the set of computing devices recover from one or more disturbances. The mathematical model can be used to explore (e.g., predict, hypothesize, extrapolate) untested disturbances that the computing devices may not recover from or may not recover from in a predefined duration of time.

The technology disclosed herein includes, but is not limited to, enhancements to the field of computer system testing and relates to testing system recovery, performance, and quality assurance. In particular, aspects of the disclosed technology can apply chaos engineering principles to computing devices that are emulating the production environment and avoid adding chaos to the actual production environment. This may enable system issues to be exposed and addressed earlier in the design lifecycle. For example, discovering issues during development or testing instead of waiting until after being deployed in the production environment. Discovering issues earlier in the design lifecycle can decrease the effects on the production environment and decrease the costs to address the issues. The technology can also provide more information on how the computing devices recover over time to a disturbance and discover particular untested scenarios that may expose undiscovered issues, enhance quality, reliability, resiliency, and performance of the set of computing devices.

Various aspects of the above referenced technology are described in details herein below by way of examples, rather than by way of limitation. The examples provided below discuss a set of computing devices that are part of a test environment and the test environment is separate from the production environment. This is done for ease of explanation of some of the features described herein. However, other examples are also within the scope of this disclosure, regardless of whether specific examples of such are provided herein. For example, the set of computing devices that are being tested can be included within the production environment and can execute on host machines that are the same or different from the host machines executing the computing devices of the production environment.

FIG. 1 depicts an illustrative architecture of elements of a computing environment 100 that includes technology for evaluating system recovery using emulated production systems, in accordance with an example of the present disclosure. It should be noted that other architectures for computing environment 100 are possible, and that the implementation of a computing environment utilizing embodiments of the disclosure are not necessarily limited to the specific architecture depicted. As shown in the example of FIG. 1, computing environment 100 can include one or more computing devices 110A-Z that are arranged as a production environment 120, a test environment 130, or a combination thereof.

Production environment 120 and test environment 130 can each be an example of a computing environment that includes one or more computing devices that process data and perform computing tasks. Production environment 120 can be any computing environment that performs the computing tasks to provide a service to an end user device. Production environment 120 can execute a production workload that involves performing production tasks using production data. Production environment 120 can be referred to as a live environment and can exist for a duration of time that is much longer than test environment 130. Test environment 130 can be any computing environment that performs the computing tasks to test an aspect of the computing devices, computing tasks, the resulting computing service, input data, output data, or a combination thereof. In one example, test environment 130 may be a temporary environment that is the same or similar to the production environment and is commissioned to perform a test or experiment and is then decommissioned. In another example, test environment 130 may be commissioned to perform the test and if the test is satisfied may become a production environment or part of an existing production environment. The output of the test environment 130 may be accessed and analyzed with or without being consumed by end user devices.

In the example illustrated by FIG. 1, test environment 130 and production environment 120 may be separate computing environments that do not share the same computing devices. In another example, test environment 130 and production environment 120 may partially or fully overlap and share one or more of the same computing devices. For example, test environment 130 may be included within production environment 120 with or without being partially or fully separated. In either example, the separation or partial separation may involve a logical separation (e.g., different virtual networks, different virtual machines, different containers or pods), a physical separation (e.g., different host machines, different physical networks, different racks or power sources), a geographic separation (e.g., different geographic locations, offices, buildings, or rooms), other separation, or a combination thereof.

Computing devices 110A-Z may include any computing device that is capable of processing data and performing a computing task. The term "computing device" may refer to a physical machine (e.g., host machine), a virtual machine, a container, or a combination thereof. Computing devices 110A-Z can include or be executed by one or more servers, workstations, personal computers (e.g., desktop computers, laptop computers), mobile computers (e.g., mobile phones, palm-sized computing devices, tablet computers, personal digital assistants (PDAs)), network devices (e.g., routers, switches, access points, other network node), other devices, or a combination thereof. Computing devices 110A-Z may have computing resources that include processors based on x86, PowerPC®, SPARC®, ARM®, other hardware architecture, or a combination thereof. In one example, computing devices 110A-Z may be part of a cloud computing system (e.g., public cloud, private cloud, hybrid cloud), an on-premise computing system (e.g., company server), or other distributed computing system, or a combination thereof. Each of computing devices 110A-Z may be configured to support one or more levels of virtualization. The virtualization levels may include hardware level virtualization (e.g., Virtual Machines (VMs)), operating system level virtualization (e.g., containers), or other virtualization, as discussed in more detail below in regards to FIG. 3.

In the example shown in FIG. 1, computing devices 110A-E may be part of production environment 120 and can be the target for setting up the emulation and may be referred to as target computing devices (e.g., target devices), production computing devices (e.g., production devices), production systems, or other term. Computing devices 110X-Z may include the one or more computing devices that are under test and may be a part of test environment 130 as illustrated. Computing devices 110X-Z can be referred to as test computing devices (e.g., test devices), test systems, test servers, or other term. One or more of computing devices 110A-E and 110X-Z can be communicably coupled to computing device 110M.

Computing device 110M can manage the testing of one or more of the other computing devices 110A-Z using an emulation component 112, a chaos component 114, and a performance component 116. The emulation component 112 can enable computing device 110M to analyze production environment 120 and configure a set of one or more computing devices 110X-Z to emulate computing devices in production environment 120. Chaos component 114 can enable computing device 110M to select and introduce a disturbance 132 to one or more of computing devices 110X-Z. Performance component 116 can enable computing device 110M to monitor the performance of the set of computing devices before, during, or after the disturbance is introduced. Performance component 116 can determine the effects of the disturbance 132 on the performance of the set of computing devices 110X-Z. Performance component 116 can then analyze and model the effects of the disturbance. As shown in FIG. 1, computing device 110 can also include configuration data 113 and performance data 115.

Configuration data 113 can represent a configuration of any portion of computing environment 100. The configuration can be a hardware configuration, a programing configuration, other configuration, or a combination thereof and can correspond to one or more computing devices in production environment 120, in test environment 130, or a combination thereof. Configuration data for computing devices 110A-Z, production environment 120, or test environment 130 can be transformed, aggregated, filtered, supplemented, before during or after being stored in a data store of computing device 110M as configuration data 113. The stored configuration data 113 can include information about the quantity, location, types, versions, identifiers, or other information for hardware and programs of some or all of the computing devices 110A-Z in computing environment 100.

In one example, configuration data 113 can include descriptive information about the hardware configuration and the programing configuration. Descriptive information about the hardware configuration can include information about computing resources and the computing topology of one or more computing devices, which are discussed in more detail below in regards to FIG. 3. The computing resources can include processor devices (e.g., CPU, GPU, ASIC, FPGA, microprocessor), storage devices (e.g., hard drive, solid-state drive, main memory, cache), adapters (e.g., network adapter, graphics adapter), other hardware device, or a combination thereof. The descriptive information of the programming configuration can include information about programing resources, such as, one or more operating systems (e.g., guest operating system, host operating system), hypervisors (e.g., virtual machine monitor), virtual machines (VMs), container runtimes (e.g., Docker®), kernels (e.g., kernel version), drivers (e.g., device drivers), libraries (e.g., shared objects, dynamic link libraries), applications, utilities, computing tasks, computing services, other programs, or a combination thereof.

Performance data 115 may represent a performance of any portion of computing environment 100. The performance can be the performance of any computing element within computing environment 100, such as, the performance of one or more computing environments (e.g., computing environment performance), computing devices (e.g., computing device performance), computing tasks (e.g., computing task performance), computing services (e.g., computing service performance), computing resource (e.g., computing resource performance), other computing element (e.g., computing element performance), or a combination thereof. The performance of a computing element can be based on a set of performances of one or more other computing elements. For example, a performance of a computing device can be based on the performance of one or more hardware devices, programs, tasks, services, or other computing element. In this example, the performance of the computing device can be referred to as a combined performance (e.g., aggregate, composite, overall, general, total performance) and is based on one or more individual performances (e.g., specific, constituent, partial performance). The performance can change over time and a degraded performance (e.g, decreased combined performance) can occur if at least one of the individual performances decrease even though one or more of the other performances in the set may stay the same or increase.

Performance data 115 may include performance data of computing elements of production environment 120, computing elements of test environment 130, or a combination thereof. Performance data 115 can represent the performance at an instant in time (e.g., point in time), over a duration of time (e.g., time period), or a combination thereof. As discussed above, the computing devices in computing environment 100 can run a workload that involves executing computing tasks to process data and provide services. Performance data 115 can represent the performance of the computing element using performance measurements.

Performance measurements may include performance measurements of any portion of computing environment 100. A performance measurement may be a quantitative measure or a qualitative measure that includes one or more numeric values (e.g., numbers, integers, decimals, fractions, percentages, ratios), non-numeric values (e.g., letters, characters, symbols), other values, or a combination thereof. A performance measurement may correspond to a speed (e.g., response per time unit), throughput (e.g., rate of incoming requests or outgoing responses), capacity (e.g., size of requests/responses), quantity (e.g., number of requests), latency (e.g., response time, delay), availability (e.g, downtime), utilization, quality, variability, consistency, other measurement, or a combination thereof.

The performance measurements may correspond to one or more hardware configurations, programing configurations, or a combination thereof. For example, the performance measurements can be related to a hardware configuration and can represent one or more measurements of a computing resource, such as, CPU measurements (e.g., processor utilization, processing speed, number of cores, size of cache), memory measurements (e.g., page faults, memory use, memory availability), persistent storage measurements (e.g., drive sizes, available capacity), interconnect measurements (e.g., bus speed, memory bandwidth, I/O bandwidth), networking measurements (e.g., network bandwidth, network latency), other hardware configuration measurement, or a combination thereof. The performance measurements can also or alternatively include measurements related to the programing configuration such as number of virtual machines, containers, running programs, processes, threads, connections, users, devices, sockets, file handles, other measurement, or a combination thereof. In one example, performance measurement may be the same or similar to performance indicators (e.g., key performance indicators (KPIs)), metrics, statistics, other term, or a combination thereof.

State data 117A-B may represent the states of different computing environments. State data 117A may represent the state of production environment 120 while it is running a production load and state data 117B may represent the state of test environment 130 while a test is being performed. State data may be based on the configuration and performance of the respective environment and can include configuration data, performance data, other data, or a combination thereof. In the example shown in FIG. 1, state data 117A can be generated by one or more computing devices 110A-E of production environment 120 and be transmitted from production environment 120 to computing device 110M. In another example, computing device 110M can monitor the state (e.g., configuration and/or performance) of one or more of the target computing devices in production environment 120 and can generate state data 117A. In either example, state data 117A can be accessed by computing device 110M and used by emulation component 112 to configure one or more computing devices 110X-Z to test their response to a disturbance 132.

Disturbance 132 can be any change to computing environment 100 that has a negative effect on the performance of computing environment 100. Disturbance 132 can be a temporary disturbance or a permanent disturbance and can be introduced by computing device 110M using chaos component 114. Disturbance 132 can have a direct effect on a particular device (e.g., computing device 110X) with or without having an effect (e.g., indirect effect) on one or more other computing devices (e.g., computing devices 110Y-Z). Example disturbances can include or be related to one or more faults, failures, errors, delays, latencies, crashes, terminations, deactivations, disablements, disconnections, incapacitations, impairments, breakdowns, shutdowns, stoppages, deficiencies, unexpected conditions, defects, flaws, malfunctions, damage, accidents, mistakes, miscalculations, reductions, surges, stresses, spikes, depletions, decreases, consumption, exhaustion, other change, or a combination thereof.

In one example, disturbance 132 may be a hardware disturbance, a programing disturbance, other disturbance, or a combination thereof. The hardware disturbance may affect the hardware configuration. In one example, a hardware disturbance can involve a processor disturbance (e.g., disable a processor or core, spike in utilization), a memory disturbance (e.g., capacity reduction, increased read/write latency), storage disturbance (e.g., drive corruption or failure), a networking disturbance (e.g., decreased bandwidth, increased latency, deactivate network adapter), other hardware configuration disturbance, or a combination thereof. The programing disturbance may affect the programing configuration. In one example, the programing disturbance can involve an operating system disturbance (e.g., OS crash), a process or thread disturbance (e.g., segmentation fault), VM or container disturbance (e.g., restart VM or container), connection disturbance (e.g., disable network socket), other programing configuration disturbance, or a combination thereof. Techniques for introducing disturbance 132 to a set of one or more computing devices is discussed in more detail below in regards to FIG. 2.

In one example, computing environment 100, production environment 120, and/or test environment 130 can be a cloud computing environment (e.g., cloud computing system, cloud system, or cloud). The cloud computing environment can provide on-demand availability of computing resources to consumers without direct management by the consumers. This configuration may be referred to as cloud computing because the computing resources may be hosted by an entity and made available to multiple consumers over the internet, which is often represented as a cloud. The entity that consumes the computing resources may be different from the entity hosting the computing resources. The hosting entity may provide the computing resources using a pool of collocated or distributed computing devices (e.g., data center or distributed system), one or more individual computing devices (e.g., edge servers or desktops), or a combination thereof. The consuming entity may provide input data (e.g., code or configurations) that enable the computing resources of the hosting entity to execute computing tasks on behalf of the consuming entity. The hosting entity may indicate configurations (e.g., configuration parameters) of the computing resources that are available for configuration and consumption by the computing tasks. In one example, the computing devices providing the services may be hosted in the cloud computing environment and the services may be consumed by consumer devices at the edge of a network (e.g., edge computing scenario, hybrid cloud scenario). In another example, the computing devices may be in the cloud computing system or at the edge and may provide services to consumer devices that are accessible over the internet (e.g., Internet of Things (IoT) scenario, Personal Computing Scenario).

Figure 2:
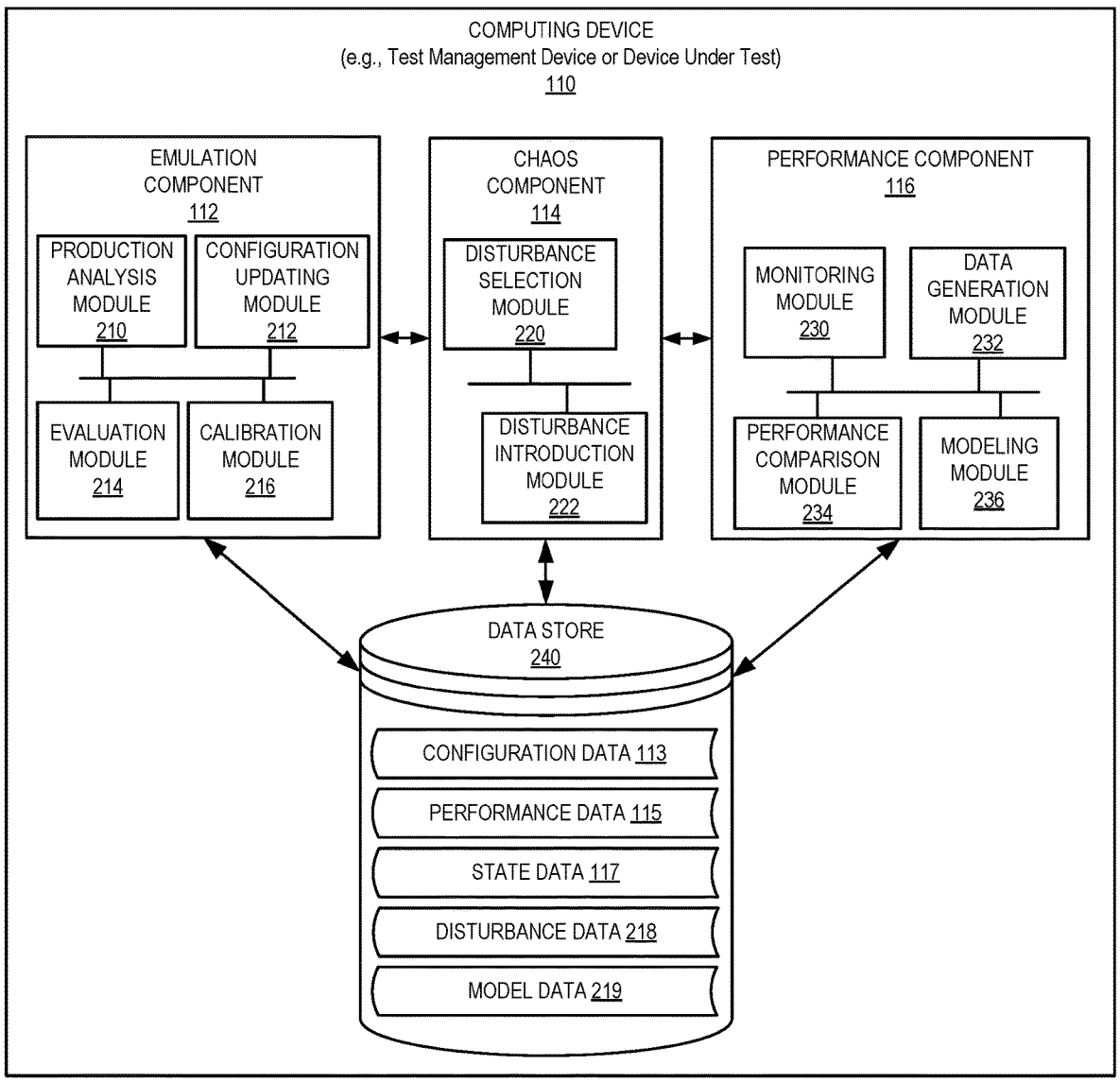
FIG. 2 is a detailed block diagram of an example computing device that can manage the testing and configuration of computing devices, in accordance with some embodiments of the present disclosure.

FIG. 2 depicts a block diagram illustrating an exemplary computing device that includes technology for evaluating system recovery using emulated production systems, in accordance with one or more aspects of the present disclosure. Computing device 110 may be the same or similar to computing device 110M or to any other computing device of FIG. 1. The features discussed in regards to components and modules of FIG. 2 may be performed by any portion of computing device 110. For example, one or more of the components or modules discussed below may be performed by a kernel, a driver, an application, other program, or a combination thereof. More or less components or modules may be included without loss of generality. For example, two or more of the components may be combined into a single component, or features of a component may be divided into two or more components. In the example illustrated, the components and modules may reside on a one or more computing devices that manage the computing devices under test (e.g., an orchestration server, provisioning server, device management server, test management server). In other examples, one or more of the components or modules may reside on one or more of the computing devices that are under test. As illustrated in FIG. 2, computing device 110 may include an emulation component 112, a chaos component 114, a performance component 116, and a data store 240.

Emulation component 112 may enable computing device 110 to analyze one or more computing devices in a production environment and configure one or more other computing devices to emulate the computing devices in the production environment. A computing device may emulate a target computing device when the performance (e.g., set of performance measurements) of the computing device are the same or similar to the performance of the target computing device. Emulation component 112 may evaluate multiple candidate configurations in order to identify the configuration that most closely emulates the target computing device. In one example, emulation component 112 may include a production analysis module 210, a configuration updating module 212, an evaluation module 214, and a calibration module 216.

Production analysis module 210 may enable computing device 110 to determine a state of the production environment while the production environment is executing a production workload. Production analysis module 210 can determine the state by analyzing state data 117 of one or more target computing devices in the production environment. State data 117 can be the same or similar to state data 117A, 117B, or a combination thereof. As discussed above, state data 117 can include configuration data (e.g., hardware configuration or programming configuration), performance data (e.g., measurements, KPIs), or a combination thereof. Computing device 110 can access state data 117 by retrieving the state data 117 from a local data store (e.g., data store 240), a remote data store (e.g., network storage), or a combination thereof. Computing device 110 can also or alternatively access state data 117 by requesting data and receiving the data (e.g., state data, configuration data, performance data) from the one or more target computing devices or from other devices in the production environment. The other devices can include one or more management devices, provisioning devices, orchestration devices, deployment devices, other device, or a combination thereof.

Production analysis module 210 can also or alternatively access the state data based on user input. For example, production analysis module 210 can initiate a prompt by computing device 110 to receive user input. The state data 117 can be determined based on the user input. In one example, the user can provide input that identifies an actual target computing device in production environment (e.g., server IP address or device name) or a generic target computing device (e.g., IBM System X running database service). Production analysis module 210 can look up the generic state data for the target computing device. The look up can be a local look up using a table with specifications of different target computing devices or can be a remote look up that uses a service available over the internet. In another example, the user can provide state data by selecting configuration or performance information from an interface or typing them into an interface. The interface can be based on a Graphical User Interface (GUI), a Command Line Interface (CLI), a Web Interface, an Application Programming Interface (API), other interface, or a combination thereof. In any of the examples, production analysis module 210 can determine state data, configuration data, or performance data for a target computing device (e.g., target performance measurements).

Configuration updating module 212 may enable computing device 110 to update the configuration of the computing devices that are going to be tested. Updating the configuration may be the same or similar to changing, modifying, adding, removing, or replacing at least a portion of a configuration. The configuration can be for a computing device, computing task, computing service, application, computing environment, other computing element, or a combination thereof. In one example, updating the configuration can involve starting one or more processes that generate a load on the computing device. In another example, updating the configuration can involve configuring local computing resources of the computing device to degrade performance and emulate the performance of the target computing device that using remote computing resources (e.g., degrade read/write performance of local hard drive to emulate read/write performance of remote network drive).

Configuration updating module 212 can update the configuration of computing devices based on a plurality of candidate configurations. The updated configuration can change the computing devices to emulate the target computing devices. In one example, updating the configuration based on the plurality of candidate configuration can involve selecting one of the candidate configurations already used. In another example, updating the configuration based on the plurality of candidate configurations can involve identifying a new configuration that is different from the candidate configurations used, as discussed below in regards to calibration module. In either example, configuration updating module 212 can update the configuration of computing devices under test as discussed in more detail below in regards to FIG. 3.

Evaluation module 214 can evaluate one or more configurations of a computing device relative to a target computing device. In one example, updating the configuration may adjust (e.g., decrease or increase) the performance of the computing device to correspond to the performance of the target computing device in the production environment. Evaluation module 214 can interact with performance component 116 to determine whether the updated configuration of the computing device provides a performance that is substantially similar to the performance of the target computing device. As discussed above, there may be many performance measurements that are associated with the performance of a computing device. The performances of different computing devices may be substantially similar if a majority of the performance measurements have a difference that is within a threshold value from one another. The threshold value can be a predetermined or predefined threshold value of n (e.g., 5%, 10%, 25%). For example, the target computing device may be associated with a first set of performance measurements (e.g., production measurements) and the configured computing device being tested may be associated with a second set of performance measurements (e.g., test measurements). Performance measurements from the different sets can be compared to one another, to the threshold, or a combination thereof. For example, a difference may be calculated and the difference can be compared to determine if the difference satisfies the threshold value. The performance measurements, differences, or thresholds can be normalized, standardized, averaged, correlated, or other operation, or a combination thereof or before, during, or after the comparison. The computing device can be considered to emulate the target computing device when a majority of the performance measurements of the set satisfy the threshold.

Calibration module 216 can calibrate the configuration of the computing device using the performance measurements of the target computing device. Calibration module 216 can use configuration updating module 212 and evaluation module 214 to experiment with multiple different candidate configurations. Calibration module 216 can select the different candidate configurations and determine which of the candidate configurations to use when testing the computing device. Calibration module 99 can involve a single iteration or multiple iterations and one or more of the iterations may or may not use feedback from one or more prior iterations. In one example, the calibrating can use feedback from a prior iteration to modify a subsequent configuration. This can involve selecting an initial candidate configuration and using configuration updating module 212 to apply the initial candidate configuration to the computing device. Calibration module 216 can cause evaluation module 214 to analyze the initial candidate configuration in view of the performance measurement of the target computing device and then modify the initial candidate configuration based on the evaluation to create a subsequent candidate configuration. The selecting, configuring, evaluating, and modifying can all be part of an iteration and one or more iterations can be performed. In another example, the calibrating can perform multiple iterations without using feedback from prior iterations. The iterations can be done in parallel or serially and in any order. In either example, the output of the iterations can be used to determine the candidate configuration that causes the computing device to have a performance that is the closest to the performance of the target computing device.

Chaos component 114 can enable computing device 110 to add chaos to the computing device by introducing one or more disturbances to the computing device under test. Chaos component 114 can enable computing device to apply chaos engineering techniques on a set of computing devices that emulate production devices and avoid applying them to the production devices. Chaos component can also or alternatively be referred to as a perturbation component and the disturbances can be referred to as perturbations. In one example, chaos component 114 may include a disturbance selection module 220 and a disturbance introduction module 222.

Disturbance selection module 220 can enable computing device to select one or more disturbances to use for the testing. As discussed above, a disturbance can be any change to a computing environment that negatively effects the performance of one or more computing devices. The change can include a fault, failure, termination, delay or anything else discussed above in regards to disturbance 132. Selecting the disturbance can involve identifying the disturbance and determining one or more attributes for introducing the disturbance. The attributes can identify a particular type of disturbance (e.g., fault, failure, termination, delay, etc.), a type of computing element for the disturbance (e.g., computing device, process, task, service, connection), location of the disturbance (e.g., computing device x, processor y, connection z), duration of the disturbance (e.g., n seconds, permanent), a severity of the disturbance (e.g., number of computing elements disturbed), an introduction time of the disturbance (e.g., 10 am, next reboot, after sync, responsive to event), other attribute, or a combination thereof.

Disturbance selection module 220 can select one or more disturbances based on user input, feedback of a prior disturbance, or a combination thereof. The user input can be provided using one or more user customizable settings (e.g., test configuration file), a user interface (e.g, Command line interface or graphical user interface), other technique, or a combination thereof. In one example, disturbance selection module 220 can provide one or more options for the disturbance, attributes for the disturbance, or a combination thereof. A user can then provide the user input based on the provided options. Disturbance selection module 220 can select one or more disturbances and the disturbances can be selected with or without using feedback from a prior disturbance, as discussed below in regards to modeling module 236. After the attributes are determined the disturbance can be introduced using disturbance introduction module 222.

Disturbance introduction module 222 can enable computing device 110 to introduce one or more disturbances to a set of one or more computing devices under test. Introducing a disturbance can be the same or similar to initiating, causing, inducing, generating, creating, producing, forming, establishing, making, instigating, originating, commencing, starting, beginning, or triggering the disturbance. As discussed above, each selected disturbance can correspond to one or more attributes that can be stored in data store 240 as disturbance data 218. Disturbance introduction module 222 can use disturbance data 218 to determine what, where, when, and how to introduce the disturbance. Disturbance introduction module 222 can analyze the disturbance data 218 to identify one or more operations to initiate the disturbance. The operations can include one or more commands, functions, procedures, instructions, opcodes, other operation, or a combination thereof. The operations may be transmitted internal to computing device 110 to a local device, external to computing device 110 to a remote device, or a combination thereof. The operation may be performed (e.g., executed or run) locally by computing device 110 or remotely by another device (e.g., computing device 110X, router, switch, power source).

In one example, introducing the disturbance can involve terminating one or more processes (e.g., terminating two of the three database management system (DBMS) processes), disabling one or more network connections (e.g., disable network adapter, switch port, router, network, address binding), deactivating a portion of one or more processors (e.g., deactivating a physical or virtual CPU or core), decreasing a memory capacity (e.g., reducing memory capacity by 20%), causing a storage drive failure (e.g., unmounting drive, overwriting a partition/volume), decreasing network transmission rate (e.g., decrease network bandwidth, throughput, or goodput), fault injection, resource consumption or exhaustion, increasing latency of a network connection (e.g., increase packet delay of NIC, switch, or router), and increasing latency of one or more memory devices (e.g., increase memory latency for read or write), other disturbances, or a combination thereof.

Performance component 116 can enable computing device 110 to monitor the performance of the set of computing devices before, during, or after the disturbances are introduced. Performance component 116 can determine the effects of disturbances on the performance of the set of computing devices under test. Performance component 116 can then analyze and model the effects of disturbance which are intended to represent how the computing devices in production environment 120 would be effected. In one example, performance component 116 may include a monitoring module 230, a data generation module 232, a performance comparison module 234, and a modeling module 236.

Monitoring module 230 can enable computing device 110 to monitor a set of one or more computing devices under test. Monitoring the set may involve active monitoring, passive monitoring, or a combination thereof. Active monitoring may involve transmitting requests for data to one or more computing elements and receiving the data in response to the requests. Passive monitoring may involve listening for data using one or more listeners. A listener can be registered for a particular event, a particular computing element, or a combination thereof. The listener can be an event handler and can be initiated when the event occurs and can access and store data associated with the event. In either the active or passive monitoring, monitoring module 230 can access instrumentation data (e.g., program instrumentation), log data (e.g., performance log, device log, system log, user log), network data (e.g., IP packets, address assignments), orchestration data (e.g., start, stop, migration of containers, VMs, workloads), profiling data, trace data, timing data, event data, administrative data, domain data (e.g., login, access, authentication, authorization), communication data, shared data, task data, service data, environment data, other data, or a combination thereof.

Data generation module 232 can enable computing device 110 to generate performance data that represents the performance of a set of one or more computing devices. Data generation module 232 may access and analyze data of monitoring module 230 to determine the performance of the set of computing devices. Data generation module 232 may then generate performance data and store the performance data in data store 240 as performance data 115. The generated and stored performance data 115 may represent the performance of a set of one or more computing devices over time. Performance data 115 may indicate effects of the one or more disturbance on the set and indicate a recovery of the set to the disturbances. As discussed above, the generated performance data may include performance measurements of the set of computing devices at a time before the disturbances and performance measurements at multiple times after the disturbances.

Performance comparison module 234 can enable computing device 110 to compare one or more performances. The performances may correspond to the same or different computing element, times, or a combination thereof. In one example, performance comparison module 234 can compare a performance of a set of one or more computing devices at a first time (e.g., before a disturbance) and a performance of the same set of one or more computing devices at a second time (e.g., after the disturbance). In another example, performance comparison module 234 can compare a performance of a first set of one or more computing devices (e.g., production devices) and a second set of one or more computing devices (e.g., test devices). In either example, performance comparison module 234 can compare the performances to identify similarities, differences, or a combination thereof.

Comparing the performances can involve comparing different sets of one or more performance measurements. Each performance measurement may correspond to at least one measurement label and at least one measurement value. Performance comparison module 234 may identify performance measurements from each of the sets that have common measurement labels and compare their respective measurement values (e.g. compare common performance measurements). The comparison of the measurement values may involve one or more mathematical operations that include subtraction, addition, division, multiplication, derivatives, integrals, averaging, normalizing, correlating, standardizing, other mathematical operation, or a combination thereof. The output of the comparing can be used to generate new performance data, supplement or update existing performance data, or a combination thereof.

In one example, performance comparison module 234 can also initiate one or more performance tests before, during, or after introducing the disturbance. The performance test can be run any time after the set of computing devices are configured to emulate the target computing device of the production environment. The performance test can include or be based on one or more benchmark tests, system tests, functional tests, regression tests, use case tests, other tests, or a combination thereof. Running the performance test can involve selecting a performance test, executing the performance test, and storing the results of the performance test.

Modeling module 236 can enable computing device 110 to analyze data discussed above and create one or more mathematical models. The mathematical model may be the same or similar to a statistical model, a probabilistic model, a machine learning model, a neural network, other mathematical representation, or a combination thereof. The mathematical model can be stored as model data 219. The model data 219 may include one or more functions, equations, expressions, operators, operands, coefficients, variables, weights, biases, features, vectors, matrices, indexes, value pairs, other data, or a combination thereof. Model data 219 can represent the mathematical relationship between input data and output data (e.g., output data as a function of input data). The input and output data can be selected from disturbance data 218, performance data 115, configuration data 113, state data 117, other data, or a combination thereof.

In one example, the mathematical model may represent relationships between disturbance data 218 and performance data 115. This may be used to map a disturbance to a performance, a performance to a disturbances, or a combination thereof. This may be advantageous because the mathematical model can be used to determine (e.g., predict, extrapolate, identify) a disturbance that maximizes or minimizes a predicted effect on the performance. This predicted disturbance can then be used to test the set of computing device to determine the actual effect on the performance of the set of computing devices.

In another example, the mathematical model may also or alternatively represent relationships between configuration data 113 and performance data 115. This may be used to map a configuration to a performance, a performance to a configuration, or a combination thereof. This may be advantageous because the mathematical model can be used to determine (e.g., predict, extrapolate, identify) a configuration of a test device that matches a performance of a production device. The determined configuration (e.g., hardware and/or programming settings) can then be applied to a set of one or more computing devices to determine if its actual performance aligns with the performance of the set of one or more computing devices in the production environment.

Figure 3:
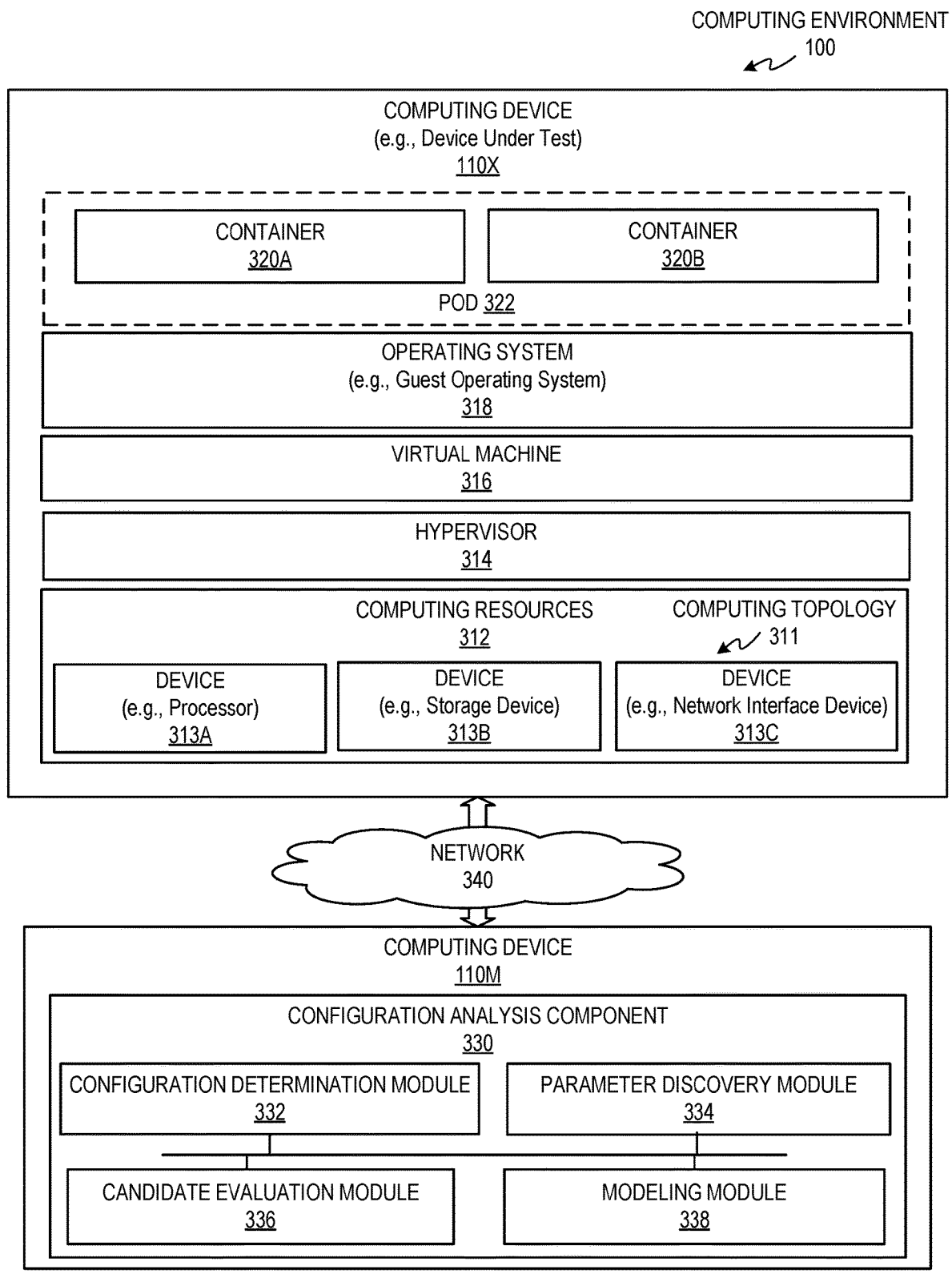
FIG. 3 is a detailed block diagram of an example computing device that is under test, in accordance with some embodiments of the present disclosure.

FIG. 3. illustrates an example computing device 110X that can be configured by computing device 110M to emulate a target computing device in a production environment, in accordance to examples of the disclosure. Computing device 110X may be a single computing device that is under test as illustrated or may be a set of one or more of computing devices that are under test (not shown). In the example illustrated in FIG. 3, computing device 110X includes computing resources 312, a hypervisor 314, a virtual machine 316, an operating system 318, and containers 320A-B. Configuration analysis component 330 can be part of computing device 110M (as shown), part of computing device 110X (not shown), or a combination thereof.

Computing device 110X may implement one or more levels of virtualization for executing programs and the levels may include hardware level virtualization, operating system level virtualization, other virtualization, or a combination thereof. The hardware level virtualization may involve a hypervisor (e.g., virtual machine monitor) that emulates portions of a physical system and manages one or more virtual machines. In contrast, operating system level virtualization may include a single operating system kernel that manages multiple isolated virtual containers. Each virtual container may share the kernel of the underlying operating system without requiring its own kernel. In the example illustrated in FIG. 3, computing device 110X can include hardware level virtualization (e.g., a virtual machine) and operating system level virtualization (e.g., containers) but in other examples computing device 110X may be absent hardware level virtualization (e.g., no virtual machines) and/or operating system level virtualization (e.g., no containers). In either example, computing device 110X can include computing resources 312 in a computing topology 311.

Computing topology 311 is the arrangement of computing resources 312 of computing device 110X. Computing topology 311 can define the arrangement of CPUs (e.g., CPU topology), memory (e.g., memory topology, NUMA topology), interconnects (e.g., interconnect topology, bus topology), or a combination thereof. In one example, computing topology 311 may be specific to hardware devices and be referred to as a hardware topology or hardware layout. Computing topology 311 can be based on the layout of sockets on one or more printed circuit boards. A socket is a hardware interface that contains one or more mechanical components for providing mechanical and electrical connections between the printed circuit board (PCB) and one of the computing resources (e.g., CPU). Each socket can receive the computing resource and communicably couple it with one or more other computing resources. A socket that receives a CPU is referred to as a CPU socket. Computing device 110 can include more than one socket and can be referred to as a multi-socket host system (e.g., multi-socket server). For illustration purposes, computing device 110 is a single socket server but in other examples it may be an N socket server, wherein N is any positive integer (e.g., 2, 4, 8, 16).

Computing resources 312 may include the physical devices that provide processing, storage, or a combination thereof. Computing resources 312 can include one or more devices 313A-C. Devices 313A-C may be any computing device that can perform computing tasks by processing data, storing data, or a combination thereof. The computing task may further involve transmitting data (e.g., output data), receiving data (e.g., input data), or a combination thereof. As shown in FIG. 3, device 313A may be one or more processors, device 313B may be one or more storage devices, and device 313C may be one or more network interface devices. The network interface device may provide access to a network internal to computing device 110X or a network external to computing device 110X (e.g., network 340) and in one example may include a network interface controller (NIC).

The processors may refer to one or more processing devices or processing units that are capable of executing instructions that encode arithmetic, logical, or I/O operations. The processor may be a single core computer processor capable of executing one instruction at a time (e.g., single pipeline of instructions) or may be a multi-core computer processor that simultaneously executes multiple instructions concurrently. The processor may be implemented as a single integrated circuit, two or more integrated circuits, or may be a component of a multi-chip module (e.g., in which individual microprocessor dies are included in a single integrated circuit package and hence share a single socket). The processor may include features of a central processing unit (CPU), graphical processing unit (GPU), a microcontroller, other computer processor, or a combination thereof. The processor may implement an instruction set architecture (ISA) that functions as an interface between the processor and computing processes being executed by the processor. The instruction set architecture may be the same or similar to x86 (e.g., Intel®, AMD®), PowerPC®, Advanced RISC Machine (ARM®), Scalable Processor Architecture (SPARC®), other computer architecture, or a combination thereof.

The storage devices may include any persistent or non-persistent data storage devices that are capable of storing digital data. The storage devices may include one or more mass storage devices that include solid-state storage (e.g., Solid State Drives (SSD)), hard drives, other persistent data storage, or a combination thereof. The storage devices may also or alternatively include memory that may function as main memory for computing device 110X. In either example, the storage device may include one or more physical memory devices. The physical memory devices may be the same or similar to volatile memory devices (e.g., RAM), non-volatile memory devices (e.g., NVRAM, NAND), other types of memory devices, or a combination thereof. The physical memory devices can be a memory module and include a dual in-line memory module (DIMM), a small outline DIMM (SO-DIMM), or various types of non-volatile dual in-line memory module (NVDIMM). The storage devices may be organized as storage nodes (e.g., memory nodes, SSD nodes) that can each include one or more physical memory devices and can implement Non-Uniform Memory Access (NUMA) and be referred to as NUMA nodes.

NUMA is a computer memory design used in multiprocessing and the memory access time can depend on the memory location relative to the memory controller. Under NUMA, a CPU can access its own local memory faster than non-local memory. This can result in the CPU having a lower latency and higher bandwidth when accessing a local memory node and having a higher latency and lower bandwidth when accessing a remote memory node. This may occur because a CPU can use a single interconnect to access local memory node and may use multiple interconnects to access a remote memory nodes. For example, a CPU can access a local memory node using one memory controller and a single interconnect (e.g., CPU-to-Memory bus) that has a combined latency of 80 nanosecond (ns) and a bandwidth of 107 Gigabytes per second (GiB/s). The same CPU can access a remote memory node using two interconnects (CPU-to-CPU and CPU-to-memory) that have a combined latency of 130 ns (larger latency of 80 ns+50 ns) and a bandwidth of approximately 35 GiB/s (e.g., smaller bandwidth that is lesser of 35 and 107 GiB/s).

The interconnects can provide communication channels between computing resources 312. Interconnects can include CPU-to-Memory interconnects that connect each CPU to its respective local memory node. Interconnects can include CPU-to-CPU interconnects that connect CPUs to one another. Each of the interconnects can include one or more interfaces, connectors, adapters, other piece of hardware or software, or a combination thereof. Interconnects can implement a standard or proprietary communication protocol that includes or is based on Compute Express Link™ (CXL), Peripheral Component Interconnect™ (e.g., PCI, PCIe), Non-Volatile Memory Express™ (NVMe), Advanced Host Controller Interface™ (AHCI), Serial Advanced Technology Attachment Interface™ (e.g., SATA, mSATA), Small Computer System Interface™ (SCSI, iSCSI), Integrated Drive Electronics™ (e.g., IDE, EIDE), InfiniBand™, other communication technology, or a combination thereof.

Computing resources 312 can be managed by a hypervisor 314 that provides hardware level virtualization. Hypervisor 314 may be any program or combination of programs and may run directly on the hardware (e.g., bare-metal hypervisor) or may run on or within a host operating system (not shown). Hypervisor 314 may manage computing resources 312 and one or more virtual machines 316. The hypervisor may be the same as a virtual machine monitor and may manage and monitor various aspects of the operations of the computing device, including the storage, memory, and network interfaces. The hypervisor may abstract the physical layer hardware features such as processors, memory, and I/O devices, and present this abstraction as virtual devices to a virtual machine 316 executing an operating system 318 (e.g., guest operating system)

Operating system 318 may be any program or combination of programs that are capable of managing computing resources of virtual machine 316 and/or computing device 110. Operating system 318 may include a kernel comprising one or more kernel space programs (e.g., memory driver, network driver, file system driver) for interacting with virtual hardware devices or physical hardware devices. In one example, Operating system 318 may include Linux™ (e.g., Fedora™, Ubuntu™), Unix (e.g., Solaris™), Microsoft Windows™, Apple Macintosh™, other operating system, or a combination thereof.

Computing device 110X may also or alternatively provide operating system level virtualization by running a computer program that provides computing resources to one or more containers 320A-B. Operating system level virtualization may be implemented within the kernel of operating system 318 and may enable the existence of multiple isolated containers. In one example, operating system level virtualization may not require hardware support and may impose little to no overhead because programs within each of the containers may use the system calls of the same underlying operating system 318. Although not illustrated, this may enable computing device 110 to provide virtualization without the need to provide hardware emulation or be run in a virtual machine (e.g., intermediate layer) as may occur with hardware level virtualization. Operating system level virtualization may provide resource management features that isolate or limit the impact of one container (e.g., container 320A) on the resources of another container (e.g., container 320B).

The operating system level virtualization may provide a pool of computing resources that are accessible by container 320A and are isolated from one or more other containers (e.g., container 320B). The pool of resources may include file system resources (e.g., particular file system state), network resources (e.g., particular network interfaces, sockets, addresses, or ports), memory resources (e.g., particular memory portions), other computing resources, or a combination thereof. The operating system level virtualization may also limit (e.g., isolate) a container's access to one or more computing resources by monitoring the container's activity and restricting the activity in view of one or more limits. The limits may restrict the rate of the activity, the aggregate amount of the activity, or a combination thereof. The limits may include one or more of file system limits, disk limits, input/out (I/O) limits, memory limits, CPU limits, network limits, other limits, or a combination thereof.

Operating system 318 may include an operating system virtualizer (e.g., container runtime) that may provide containers 320A-B with access to computing resources. The operating system virtualizer may wrap one or more processes (e.g., of a particular service) in a complete file system that contains the code, runtime, system tools, system libraries, and other data present on the node (e.g., a particular file system state) that can be used by the processes executing within the container. In one example, the operating system virtualizer may be the same or similar to Docker® for Linux® or Windows®, ThinApp® by VMWare®, Solaris Zones® by Oracle®, other program, or a combination thereof. In one example, the operating system virtualization may support and automate the packaging, deployment, and execution of applications inside containers (e.g., Open Shift®).

Each of the containers 320A-B may refer to a resource-constrained process space of computing device 110 that can execute functionality of the program data. Containers 320A-B may be referred to as user-space instances, virtualization engines (VE), or jails and may appear to a user as a standalone instance of the user space of operating system 318. Each of the containers 320A-B may share the same kernel but may be constrained to use only a defined set of computing resources (e.g., CPU, memory, I/O). Aspects of the disclosure can create one or more containers to host a framework or provide other functionality of a service (e.g., web application functionality, database functionality) and may therefore be referred to as "service containers," "application containers," or "task containers."

Pod 322 may be a data structure that is used to organize one or more containers 320A-B and enhance sharing between the containers, which may reduce the level of isolation between containers within the same pod. Each pod may include one or more containers that share some computing resources with another container associated with the pod. Each pod may be associated with a unique identifier, which may be a networking address (e.g., IP address), that allows applications to use ports without a risk of conflict. A pod may be associated with a pool of resources and may define a volume, such as a local disk directory or a network disk and may expose the volume to one or more (e.g., all) of the containers within the pod. In one example, all of the containers associated with a particular pod may be co-located on the same computing device 110Y. In another example, the containers associated with a particular pod may be located on different computing devices that are on the same or different physical machines.

Configuration analysis component 330 can be used to determine the configuration of computing device 110X and to discover parameters that are available to modify the configuration. In one example, configuration analysis component 330 can include a configuration determination module 332, a parameter discovery module 334, a candidate evaluation module 336, and a modeling module 338.

Configuration determination module 332 can determine the configuration of computing device 110X. As discussed above, the configuration can be a hardware configuration or a programing configuration. Determining the configuration of computing device 110X can involve accessing data about the configuration of computing device 110X from operating system 318, computing resources 312, or a combination thereof and storing it as configuration data 113 in a data store. The operating system is responsible for managing computing resources and often stores configuration data in one or more storage objects, such as files (e.g., configuration files, settings files), registries (e.g., hives), databases (e.g., configuration records), other storage object, or a combination thereof. Configuration determination module 332 can access configuration data from the operating system (OS) by making one or more requests (e.g., system calls) and receiving responses with the configuration data. Configuration determination module 332 can also or alternatively request configuration data directly from the computing resources by transmitting requests to the computing resource (e.g., CPU, memory controller) and receiving a response with the configuration data.

Parameter discovery module 334 can enable computing device 110X to analyze configuration data 113 to identify parameters that are available to update a configuration. The parameters may be referred to a configuration parameters and may indicate available options for a configuration and may be included in the configuration data. Parameter discovery module 334 may be aware of a global set of parameters and can analyze the configuration data to detect which parameters in the global parameter set are available on computing device 110X. In one example, parameter discovery module 334 can determine available parameter values corresponding to a quantity or computing resources available to each process, container, or VM. The parameters for the computing resources may also include bus speed options (e.g., 133 MHz, 266 MHz), number of parallel threads per CPU (e.g., 4, 8, 56 concurrent threads), options for thread affinity (e.g., thread 1 bound to core 1), pinning memory of a thread (e.g., remote or local), options to detour the data path (e.g., 0, 1, or 3 hops). Each of the available parameters can correspond to one or more alternate parameter values. The resulting set of available parameters and their corresponding set of available parameter values can define a configuration parameter space for computing device 110X.

The configuration parameter space can represent different options for configuring computing device 110X. The configuration parameter space can be an n-dimensional space where each dimension corresponds to a parameter in the set of available parameters and the locations along the dimension correspond to the alternate parameter values for that parameter. For example, the set of available parameter values can include a first parameter with two options (e.g., deactivate 1 core or two cores of quad core processor) and a second parameter with three options (e.g., bus speed of underclocked, normal, or overclocked), and a third parameter with nine options (e.g., 0-8 threads running a synthetic load). In this simplified example, the set of available parameters is 3 and the set of available parameter values is 14 (2+3+9).

Candidate evaluation module 336 can enable computing device 110X to select and evaluate one or more candidate configurations for computing device 110X. Each of the candidate configurations can be a particular combination of parameter values and can correspond to a single point in the configuration parameter space. The configuration parameter space can have n-dimensions and therefore each point in the configuration parameter space can correspond to n coordinate values (e.g., a value along the first dimension, second dimension, and third dimension). The combination of coordinate values that identify the point map to the combination of available parameter values that make up a single candidate configuration. In the simplified example discussed above, the configuration parameter space is based on the set of 3 available parameters that have a total of 14 available parameter values. This results in 54 potential combinations (e.g., 2*3*9) and each of the potential combinations can be a potential configuration of computing device 110X.

Candidate evaluation module 336 can explore the configuration parameter space by selecting which of the potential configurations should be a candidate configuration that gets evaluated. In one example, candidate evaluation module 336 can select every potential combinations as a candidate configuration. In another example, candidate evaluation module 336 can select a subset of the potential combinations as candidate configurations. In yet another example, candidate evaluation could start with a candidate set, and stop when a sufficiently good candidate set was found. In any example, candidate evaluation module 336 can evaluate each of the selected candidate configurations by measuring the performance while the computing device 110X is using the candidate configuration. The performance measurements can be measured during normal use of computing device 110X or while running a test (e.g., benchmark test). The evaluating can be the same or similar to experimenting, testing, executing, running, other term, or a combination thereof. Candidate evaluation module 336 can use one or more programs to test and measure the performance of the candidate configuration. The programs can be the same or similar to tools, utilities, or features and include CPU manufacturer utilities (e.g., Intel Memory Latency Checker (MLC), Intel Processor Counter Monitor (PCM)), third party tools (e.g., Likwid, likwid-bench, sysinternals, ProcMon,), OS utilities (e.g., Task Manager), other programs, or a combination thereof. Before, during, or after evaluating the candidate configurations, candidate evaluation module 336 can store the resulting performance measurements of each candidate configuration. The resulting performance measurements (e.g., latency, bandwidth, etc) can be stored in a data store and can also or alternatively be used to update the parameter space (e.g., adding results to the points).

Modeling module 338 can analyze performance data and generate a model to represent the effects of configuration updates on the performance of computing device 110X. In one example, the model can be a mathematical model that represents the characteristics of computing device 110X as a function of the available parameter values. In another example, the model can be a data structure that maps characteristics of computing device 110X to the corresponding parameter values or candidate configurations. In either example, modeling module 338 can model all of the evaluated candidate combinations which can include all of the potential combinations in the parameter space or a subset of the potential combinations (e.g., modeling data 219). The results of the modeling can be displayed to the user to enable the user to determine the range of characteristics that can achieve by re-configuring computing device 110X.

A combinatorial explosion can be avoided by evaluating an initial set of the potential combination (candidate configurations). The initial set can be simple candidate configurations that include a change to a single parameter or a small subset of the parameters. For example, a first candidate configuration includes a change to a first parameter and a second candidate configuration includes a change to a second parameter and both candidate configuration are absent changes to any of the other parameters. All of the candidate configuration can be defined by the parameter values that are different from another configuration and therefore a candidate configuration can be represented by a single parameter value. The other configuration can be a base configuration, a default configuration, a prior configuration, a current configuration, a future configuration, or a combination thereof. This is advantageous because a particular configuration of computing device 110X can correspond to hundreds or thousands of different parameter values.

Network 340 may enable computing device 110 to access the computing device 110X that is under test. Network 340 may be a public network (e.g., the internet), a private network (e.g., a local area network (LAN) or wide area network (WAN)), or a combination thereof. In one example, network 340 may include a wired or a wireless infrastructure, which may be provided by one or more wireless communications systems, such as a wireless fidelity (WiFi) hotspot connected with the network 340 and/or a wireless carrier system that can be implemented using various data processing equipment, communication towers, etc.

Figure 4:
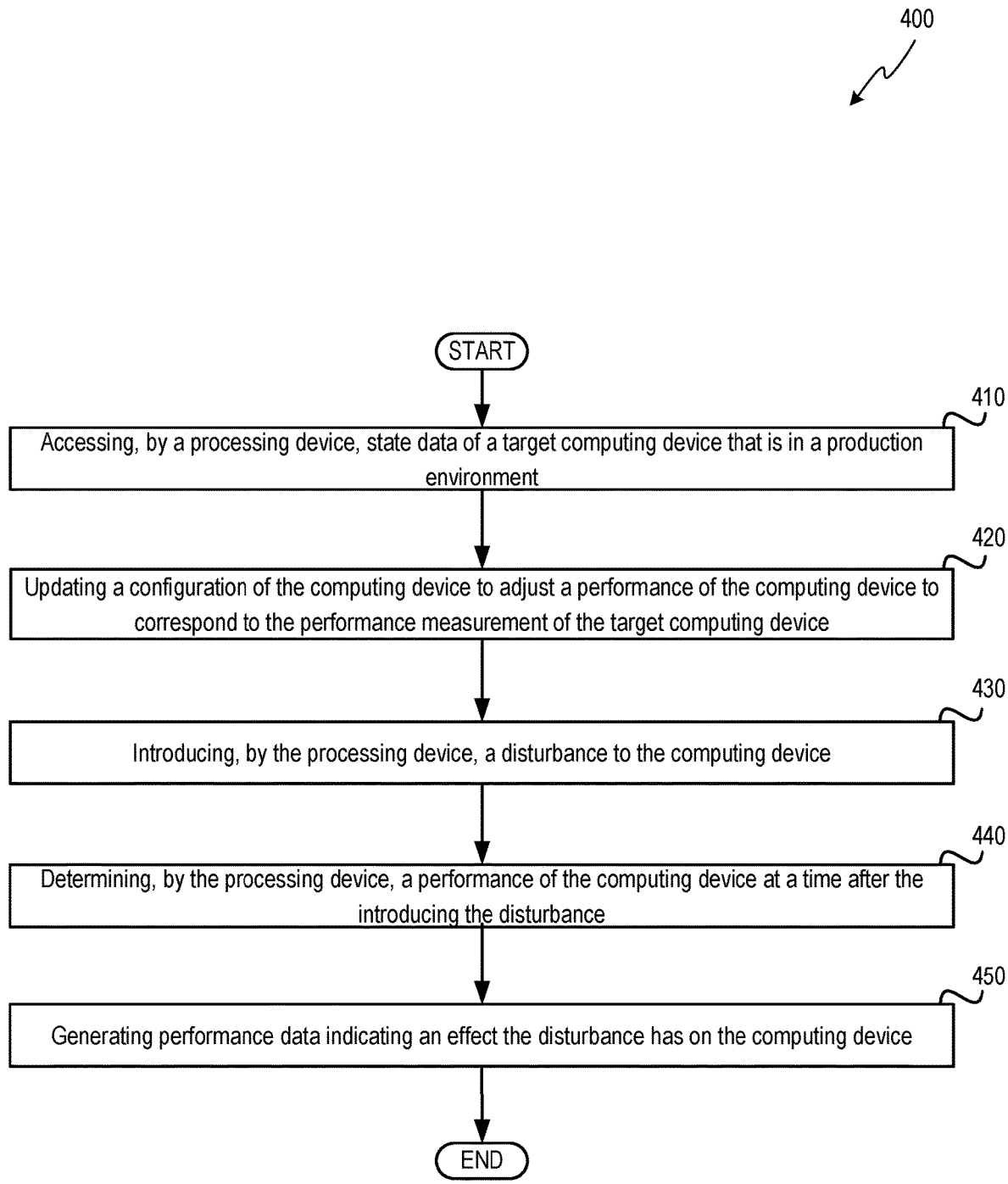
FIG. 4 is a flow chart of a method for evaluating system recovery using emulated production systems, in accordance with some embodiments of the present disclosure.

FIG. 4 depicts a flow diagram of one illustrative example of a method 400 for evaluating system recovery using emulated production systems, in accordance with one or more aspects of the present disclosure. Method 400 and each of its individual functions, routines, subroutines, or operations may be performed by one or more processors of the computer device executing the method. In certain implementations, method 400 may be performed by a single computing device. Alternatively, method 400 may be performed by two or more computing devices, each computing device executing one or more individual functions, routines, subroutines, or operations of the method. For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by emulation component 112, chaos component 114, and performance component 116 as shown in FIGS. 1 and 2. Method 400 may be performed by processing devices of a server device or a client device and may begin at block 410.

At block 410, a processing device may access state data of a target computing device that is in a production environment. The state data can include one or more performance measurements of the target computing device. The target computing device may be a single computing device or a set of multiple computing devices and each computing device can be a physical device (e.g., host machine, computer), a virtual device (e.g., virtual machine, container), or a combination thereof. The performance measurements of the target computing device can include measurements for a duration, latency, rate, other measurement, or a combination thereof for processing incoming requests or outgoing responses. The requests and responses can correspond to a computing task or computing service and can include web requests and responses, database request and responses, data processing requests and responses, search requests and responses, other requests and responses, or a combination thereof. In one example, the state data is received from the production environment (e.g., the target computing device) and represents aspects (e.g., configuration and/or performance) of the production environment. In another example, the state data represents aspects of the production environment and is received from a device separate from the production environment (e.g., a device in the test environment).

At block 420, the processing device may update a configuration of the computing device to adjust (e.g., decrease or increase) a performance of the computing device to correspond to the performance measurement of the target computing device. The updated configuration may be based on the received state data of the production environment. In one example, the computing device can be or include a set of computing devices in the test environment and the target computing device can be or include a set of computing devices in the production environment. Updating the configuration can involve updating the configuration of the set of computing devices to emulate the performance of the set of target computing devices while they are experiencing a production load. In one example, the processing device can select a configuration of the computing device that emulates the target computing device of the production environment. The selecting may involve determining that the target computing device of the production environment uses remote computing resources and configuring local computing resources of the computing device to degrade performance and emulate the performance of the target computing device using the remote computing resources.

The processing device may calibrate the configuration of the computing device in view of the performance measurement of the target computing device. The calibrating may involve updating the computing device to comprise a first candidate configuration and evaluating the first candidate configuration in view of the performance measurement of the target computing device. The processing device can then modify, based on the evaluating, the first candidate configuration to create a second candidate configuration. The processing device can determine that the second candidate configuration causes the computing device to having a performance that is substantially similar to the performance of the target computing device (e.g., performance measurements sets differ by less than 10%).

The processing device may evaluate each of a plurality of candidate configurations after they are applied to the computing device to determine the configuration to use for testing. One or more of the plurality of candidate configurations can generate a load on the computing device to degrade the performance so that it aligns with a target computing device. Each of the plurality of candidate configurations may correspond to a point in a configuration parameter space and include a particular combination of parameter values. The configuration parameter space may represent some or all of the available parameter values of the host system. In one example, evaluating the plurality of candidate configurations can involve exploring the configuration parameter space of the computing device. The exploring can involve selecting a candidate configuration based on a set of available parameter values and updating the configuration of the computing device to apply the candidate configuration. The processing device can then evaluate the candidate configuration by generating, capturing, or recording performance measurements of the computing device and storing the performance measurements.

At block 430, the processing device may introduce a disturbance to the computing device. Introducing the disturbance may involve at least one of terminating a process, disabling a network connection, deactivating a processor, decreasing a memory capacity, causing a storage drive failure, decreasing network bandwidth, increasing network latency, and increasing memory latency. In one example, the processing device can create, based on the generated performance data, one or more mathematical models that represent the performance of the computing device as a function of one or more disturbances. The mathematical model can be used (e.g., extrapolated) to identify a disturbance that is untested and to introduce the untested disturbance to the computing device.

At block 440, the processing device may determine a performance of the computing device at a time after introducing the disturbance. The processing device my determine the performance by actively monitoring or passively monitoring the computing device. Active monitoring may involve transmitting requests for data to one or more computing elements and receiving the data in response to the requests. Passive monitoring may involve listening for data using one or more listeners. A listener can be registered for a particular event, a particular computing element, or a combination thereof. The listener can be an event handler and can be initiated when the event occurs and can access and store data associated with the event. In either the active or passive monitoring, monitoring module 230 can access log data (e.g., performance log, device log, system log, user log), network data (e.g., IP packets), instrumentation data, orchestration data, administrative data, communication data, shared data, other data, or a combination thereof.

At block 450, the processing device may generate performance data indicating an effect the disturbance has on the computing device. The generated performance data can represent the performance of the computing device over time and represent a recovery of the computing device to the disturbance. The generated performance data can include one or more performance measurements of the computing device at a time before the disturbance and one or more performance measurements at each of a plurality of times after the disturbance. Responsive to completing the operations described herein above with references to block 450, the method may terminate.

Figure 5:
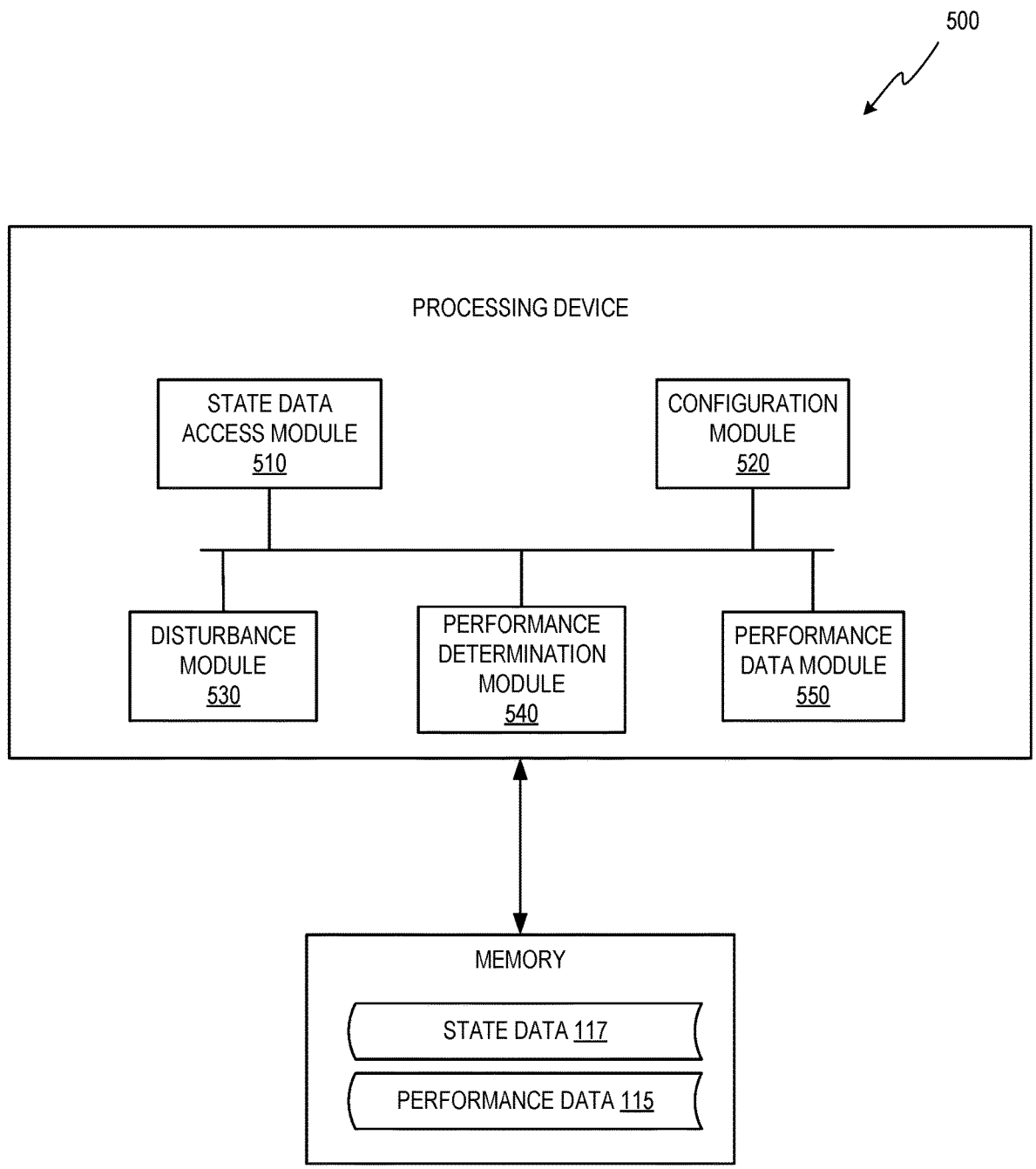
FIG. 5 is a block diagram of a system for evaluating system recovery using emulated production devices, in accordance with some embodiments of the present disclosure.

FIG. 5 depicts a block diagram of a computer system 500 operating in accordance with one or more aspects of the present disclosure. Computer system 500 may be the same or similar to computing device 110M or computing devices 110 or 110A-Z (e.g., 110M or 110X) of FIGS. 1-3 and may include one or more processing devices and one or more memory devices. In the example shown, computer system 500 may include a state data access module 510, an configuration module 520, a disturbance module 530, a performance determination module 540, and a performance data module 550.

State data access module 510 may enable a processing device to access state data of a target computing device that is in a production environment. The state data can include one or more performance measurements of the target computing device. The target computing device may be a single computing device or a set of multiple computing devices and each computing device can be a physical device (e.g., host machine, computer), a virtual device (e.g., virtual machine, container), or a combination thereof. The performance measurements of the target computing device can include measurements for a duration, latency, rate, other measurement, or a combination thereof for processing incoming requests or outgoing responses. The requests and responses can correspond to a computing task or computing service and can include web requests and responses, database request and responses, data processing requests and responses, search requests and responses, other requests and responses, or a combination thereof. In one example, the state data is received from the production environment (e.g., the target computing device) and represents aspects (e.g., configuration and/or performance) of the production environment. In another example, the state data represents aspects of the production environment and is received from a device separate from the production environment (e.g., a device in the test environment).

Configuration module 520 may enable the processing device to update a configuration of the computing device to adjust (e.g., decrease or increase) a performance of the computing device to correspond to the performance measurement of the target computing device. The updated configuration may be based on the received state data of the production environment. In one example, the computing device can be or include a set of computing devices in the test environment and the target computing device can be or include a set of computing devices in the production environment. Updating the configuration can involve updating the configuration of the set of computing devices to emulate the performance of the set of target computing devices while they are experiencing a production load. In one example, the processing device can select a configuration of the computing device that emulates the target computing device of the production environment. The selecting may involve determining that the target computing device of the production environment uses remote computing resources and configuring local computing resources of the computing device to degrade performance and emulate the performance of the target computing device using the remote computing resources.

The processing device may calibrate the configuration of the computing device in view of the performance measurement of the target computing device. The calibrating may involve updating the computing device to comprise a first candidate configuration and evaluating the first candidate configuration in view of the performance measurement of the target computing device. The processing device can then modify, based on the evaluating, the first candidate configuration to create a second candidate configuration. The processing device can determine that the second candidate configuration causes the computing device to having a performance that is substantially similar to the performance of the target computing device (e.g., performance measurements sets differ by less than 10%).

The processing device may evaluate each of a plurality of candidate configurations after they are applied to the computing device to determine the configuration to use for testing. One or more of the plurality of candidate configurations can generate a load on the computing device to degrade the performance so that it aligns with a target computing device. Each of the plurality of candidate configurations may correspond to a point in a configuration parameter space and include a particular combination of parameter values. The configuration parameter space may represent some or all of the available parameter values of the host system. In one example, evaluating the plurality of candidate configurations can involve exploring the configuration parameter space of the computing device. The exploring can involve selecting a candidate configuration based on a set of available parameter values and updating the configuration of the computing device to apply the candidate configuration. The processing device can then evaluate the candidate configuration by generating, capturing, or recording performance measurements of the computing device and storing the performance measurements.

Disturbance module 530 may enable the processing device to introduce a disturbance to the computing device. Introducing the disturbance may involve at least one of terminating a process, disabling a network connection, deactivating a processor, decreasing a memory capacity, causing a storage drive failure, decreasing network bandwidth, increasing network latency, and increasing memory latency. In one example, the processing device can create, based on the generated performance data, one or more mathematical models that represent the performance of the computing device as a function of one or more disturbances. The mathematical model can be used (e.g., extrapolated) to identify a disturbance that is untested and to introduce the untested disturbance to the computing device.

Performance determination module 540 may enable the processing device to determine a performance of the computing device at a time after introducing the disturbance. The processing device my determine the performance by actively monitoring or passively monitoring the computing device. Active monitoring may involve transmitting requests for data to one or more computing elements and receiving the data in response to the requests. Passive monitoring may involve listening for data using one or more listeners. A listener can be registered for a particular event, a particular computing element, or a combination thereof. The listener can be an event handler and can be initiated when the event occurs and can access and store data associated with the event. In either the active or passive monitoring, monitoring module 230 can access log data (e.g., performance log, device log, system log, user log), network data (e.g., IP packets), instrumentation data, orchestration data, administrative data, communication data, shared data, other data, or a combination thereof.

Performance data module 550 may enable the processing device to generate performance data indicating an effect the disturbance has on the computing device. The generated performance data can represent the performance of the computing device over time and represent a recovery of the computing device to the disturbance. The generated performance data can include one or more performance measurements of the computing device at a time before the disturbance and one or more performance measurements at each of a plurality of times after the disturbance. Responsive to completing the operations described herein above with references to block 550, the method may terminate.

Figure 6:
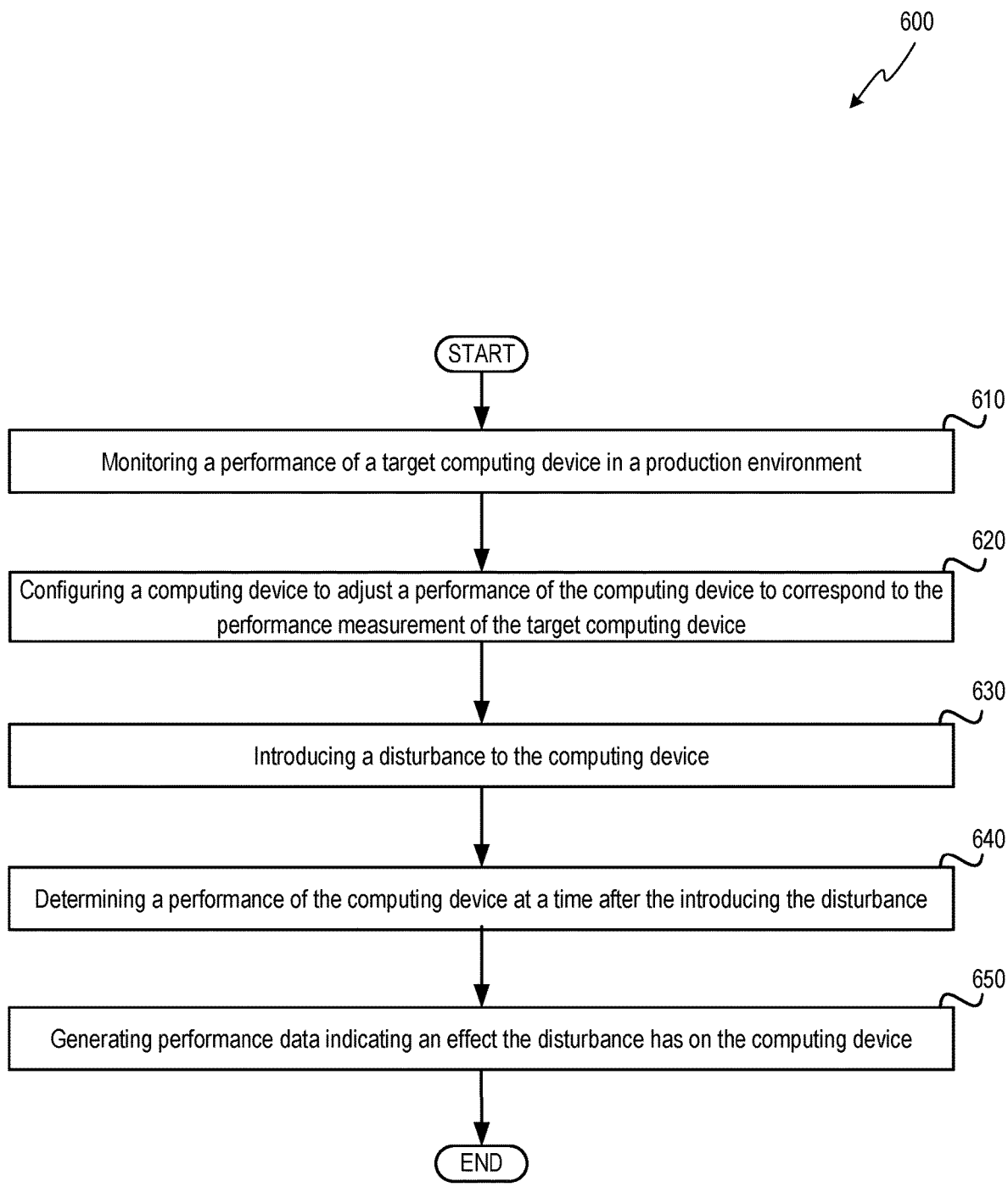
FIG. 6 is a flow chart of another method for evaluating system recovery using emulated production systems, in accordance with some embodiments of the present disclosure.

FIG. 6 is a depicts a flow diagram of one illustrative example of a method 600 for evaluating system recovery using emulated production systems, in accordance with one or more aspects of the present disclosure. Method 600 and each of its individual functions, routines, subroutines, or operations may be performed by one or more processors of the computer device executing the method. In certain implementations, method 600 may be performed by a single computing device. Alternatively, method 600 may be performed by two or more computing devices, each computing device executing one or more individual functions, routines, subroutines, or operations of the method. For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 600 may be performed by emulation component 112, chaos component 114, and performance component 116 as shown in FIGS. 1 and 2. Method 600 may be performed by processing devices of a server device or a client device and may begin at block 610.

At block 610, a processing device may monitoring a performance of a target computing device in a production environment. The monitoring may generate performance measurement for the target computing device. The target computing device may be a single computing device or a set of multiple computing devices and each computing device can be a physical device (e.g., host machine, computer), a virtual device (e.g., virtual machine, container), or a combination thereof. The performance measurements of the target computing device can include measurements for a duration, latency, rate, other measurement, or a combination thereof for processing incoming requests or outgoing responses. The requests and responses can correspond to a computing task or computing service and can include web requests and responses, database request and responses, data processing requests and responses, search requests and responses, other requests and responses, or a combination thereof. In one example, the state data is received from the production environment (e.g., the target computing device) and represents aspects (e.g., configuration and/or performance) of the production environment. In another example, the state data represents aspects of the production environment and is received from a device separate from the production environment (e.g., a device in the test environment).

At block 620, the processing device may configuring a computing device to adjust (e.g., decrease or increase) a performance of the computing device to correspond to the performance measurement of the target computing device. The configuring may be based on the received state data of the production environment. In one example, the computing device can be or include a set of computing devices in the test environment and the target computing device can be or include a set of computing devices in the production environment. The configuring can involve updating the configuration of the set of computing devices to emulate the performance of the set of target computing devices while they are experiencing a production load. In one example, the processing device can select a configuration of the computing device that emulates the target computing device of the production environment. The selecting may involve determining that the target computing device of the production environment uses remote computing resources and configuring local computing resources of the computing device to degrade performance and emulate the performance of the target computing device using the remote computing resources.

The processing device may calibrate the configuration of the computing device in view of the performance measurement of the target computing device. The calibrating may involve updating the computing device to comprise a first candidate configuration and evaluating the first candidate configuration in view of the performance measurement of the target computing device. The processing device can then modify, based on the evaluating, the first candidate configuration to create a second candidate configuration. The processing device can determine that the second candidate configuration causes the computing device to having a performance that is substantially similar to the performance of the target computing device (e.g., performance measurements sets differ by less than 10%).

The processing device may evaluate each of a plurality of candidate configurations after they are applied to the computing device to determine the configuration to use for testing. One or more of the plurality of candidate configurations can generate a load on the computing device to degrade the performance so that it aligns with a target computing device. Each of the plurality of candidate configurations may correspond to a point in a configuration parameter space and include a particular combination of parameter values. The configuration parameter space may represent some or all of the available parameter values of the host system. In one example, evaluating the plurality of candidate configurations can involve exploring the configuration parameter space of the computing device. The exploring can involve selecting a candidate configuration based on a set of available parameter values and updating the configuration of the computing device to apply the candidate configuration. The processing device can then evaluate the candidate configuration by generating, capturing, or recording performance measurements of the computing device and storing the performance measurements.

At block 630, the processing device may introduce a disturbance to the computing device. Introducing the disturbance may involve at least one of terminating a process, disabling a network connection, deactivating a processor, decreasing a memory capacity, causing a storage drive failure, decreasing network bandwidth, increasing network latency, and increasing memory latency. In one example, the processing device can create, based on the generated performance data, one or more mathematical models that represent the performance of the computing device as a function of one or more disturbances. The mathematical model can be used (e.g., extrapolated) to identify a disturbance that is untested and to introduce the untested disturbance to the computing device.

At block 640, the processing device may determine a performance of the computing device at a time after the introducing the disturbance. The processing device my determine the performance by actively monitoring or passively monitoring the computing device. Active monitoring may involve transmitting requests for data to one or more computing elements and receiving the data in response to the requests. Passive monitoring may involve listening for data using one or more listeners. A listener can be registered for a particular event, a particular computing element, or a combination thereof. The listener can be an event handler and can be initiated when the event occurs and can access and store data associated with the event. In either the active or passive monitoring, monitoring module 230 can access log data (e.g., performance log, device log, system log, user log), network data (e.g., IP packets), instrumentation data, orchestration data, administrative data, communication data, shared data, other data, or a combination thereof.

At block 650, the processing device may generate performance data indicating an effect the disturbance has on the computing device. The generated performance data can represent the performance of the computing device over time and represent a recovery of the computing device to the disturbance. The generated performance data can include one or more performance measurements of the computing device at a time before the disturbance and one or more performance measurements at each of a plurality of times after the disturbance. Responsive to completing the operations described herein above with references to block 650, the method may terminate.

Figure 7:
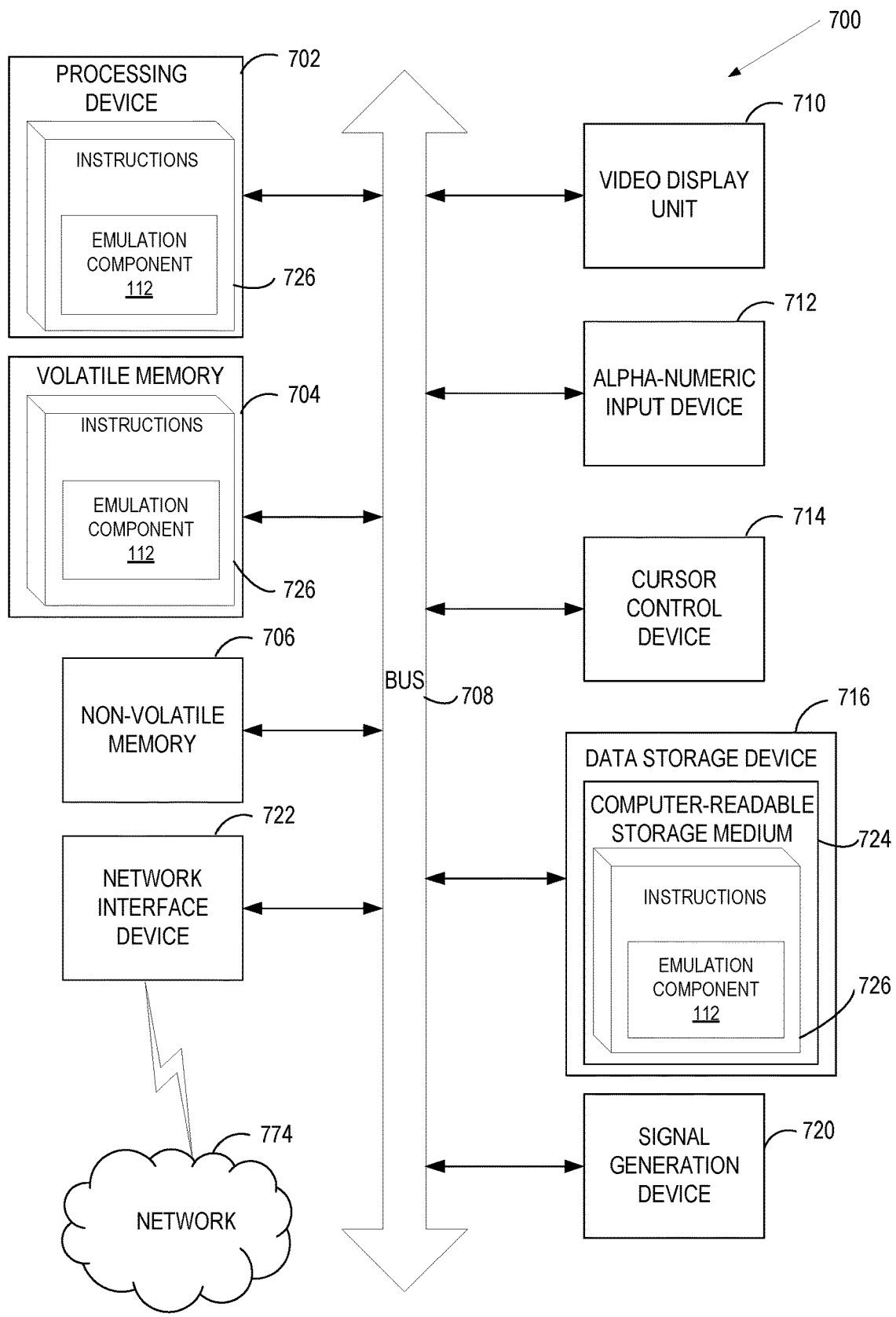
FIG. 7 is a block diagram of an example computer system in which embodiments of the present disclosure can operate.

FIG. 7 depicts a block diagram of a computer system operating in accordance with one or more aspects of the present disclosure. In various illustrative examples, computer system 700 may correspond to one or more of computing devices 110A-Z of FIG. 1, computing device 110 of FIG. 2. Computer system 700 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alpha-numeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing method 300 and for encoding components 132, 134, and 136 of FIGS. 1-2.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Example 1 is a method comprising: accessing, by a processing device, state data of a target computing device that is in a production environment, the state data comprising a performance measurement of a target computing device; updating a configuration of a computing device to adjust a performance of the computing device to correspond to the performance measurement of the target computing device; introducing, by the processing device, a disturbance to the computing device; determining, by the processing device, a performance of the computing device at a time after the introducing the disturbance; and generating performance data indicating an effect the disturbance has on the computing device.

Example 2 is a method of example 1, wherein the target computing device comprises a set of computing devices in the production environment and the computing device comprises a set of computing devices in a test environment, and wherein updating the configuration comprises updating a configuration of the set of computing devices to emulate a performance of the set of target computing devices while experiencing a production load.

Example 3 is a method of example 1, wherein introducing the disturbance comprises at least one of terminating a process, disabling a network connection, deactivating a processor, decreasing a memory capacity, causing a storage drive failure, decreasing network bandwidth, increasing network latency, and increasing memory latency.

Example 4 is a method of example 1, wherein the generated performance data represents the performance of the computing device over time and represents a recovery of the computing device to the disturbance, and wherein the generated performance data comprises a performance measurement of the computing device at a time before the disturbance and a performance measurement at each of a plurality of times after the disturbance.

Example 5 is a method of example 1, further comprising evaluating each of a plurality of candidate configurations after being applied to the computing device, wherein the plurality of candidate configurations comprises a candidate configuration that generates a load on the computing device;

Example 6 is a method of example 1, further comprising calibrating the configuration of the computing device in view of the performance measurement of the target computing device, wherein the calibrating comprises: updating the computing device to comprise a first candidate configuration; evaluating the first candidate configuration in view of the performance measurement of the target computing device; modify, based on the evaluating, the first candidate configuration to create a second candidate configuration; and determining the second candidate configuration causes the computing device to comprise a performance measurement that is substantially similar to the performance measurement of the target computing device.

Example 7 is a method of example 1, further comprising: receiving state data of the production environment that comprises the target device, wherein the state data represents a configuration and a performance of the production environment; and configuring a test environment that comprises the computing device to emulate the performance of the production environment, wherein the configuring is based on the received state data of the production environment.

Example 8 is a method of example 1, wherein the performance measurement of the target computing device comprise one or more of a duration, latency, or rate for processing incoming requests or outgoing responses.

Example 9 is a method of example 1, further comprising selecting the configuration of the computing device that emulates the target computing device of the production environment, wherein the selecting comprises: determining the target computing device of the production environment uses remote computing resources; and configuring local computing resources of the computing device to degrade performance and emulate the performance of the target computing device using the remote computing resources.

Example 10 is a system comprising: a memory; and a processing device communicably coupled to the memory, the processing device to: access state data of a target computing device that is in a production environment, the state data comprising a performance measurement of a target computing device; update a configuration of a computing device to adjust a performance of the computing device to correspond to the performance measurement of the target computing device; introduce a disturbance to the computing device; determine a performance of the computing device at a time after the introducing the disturbance; and generate performance data indicating an effect the disturbance has on the computing device.

Example 11 is a system of example 10, wherein the target computing device comprises a set of computing devices in the production environment and the computing device comprises a set of computing devices in a test environment, and wherein to update the configuration the processing device is to configure the set of computing devices to emulate a performance of the set of target computing devices while experiencing a production load.

Example 12 is a system of example 10, wherein to introduce the disturbance, the processing device is to perform at least one of terminate a process, disable a network connection, deactivate a processor, decrease a memory capacity, cause a storage drive failure, decrease network bandwidth, increase network latency, and increase memory latency.

Example 13 is a system of example 10, wherein the performance data represents the performance of the computing device over time and represents a recovery of the computing device to the disturbance, and wherein the performance data comprises a performance measurement of the computing device at a time before the disturbance and a performance measurement at each of a plurality of times after the disturbance.

Example 14 is a system of example 10, wherein the processing device is further to evaluate each of a plurality of candidate configurations after being applied to the computing device, wherein the plurality of candidate configurations comprises a candidate configuration that generates a load on the computing device;

Example 15 is a system of example 10, wherein the processing device is further to calibrate the configuration of the computing device in view of the performance measurement of the target computing device.

Example 16 is a system of example 10, wherein the processing device is further to: receive state data that represents a configuration and a performance of a production environment that comprises the target device; and configure a test environment that comprises the computing device to emulate the performance of the production environment, wherein the configuring is based on the received state data of the production environment.

Example 17 is a system of example 10, wherein the performance measurement of the target computing device comprise one or more of a duration, latency, or rate for processing incoming requests or outgoing responses.

Example 18 is a system of example 10, wherein the processing device is further to: determine the target computing device of the production environment uses remote computing resources; and configure local computing resources of the computing device to degrade performance and emulate the performance of the target computing device using the remote computing resources.

Example 19 is a non-transitory machine-readable storage medium storing instructions which, when executed, cause a processing device to perform operations comprising: monitoring a performance of a target computing device in a production environment, wherein the monitoring generates a performance measurement for the target computing device; configuring a computing device to adjust a performance of the computing device to correspond to the performance measurement of the target computing device; introducing a disturbance to the computing device; determining a performance of the computing device at a time after the introducing the disturbance; and generating performance data indicating an effect the disturbance has on the computing device.

Example 20 is a non-transitory machine-readable storage medium of example 19, wherein the target computing device comprises a set of computing devices in the production environment and the computing device comprises a set of computing devices in a test environment, and wherein updating the configuration comprises updating a configuration of the set of computing devices to emulate a performance of the set of target computing devices while experiencing a production load.

Example 21 is a non-transitory machine-readable storage medium of example 19, wherein introducing the disturbance comprises at least one of terminating a process, disabling a network connection, deactivating a processor, decreasing a memory capacity, causing a storage drive failure, decreasing network bandwidth, increasing network latency, and increasing memory latency.

Example 22 is a non-transitory machine-readable storage medium of example 19, wherein the generated performance data represents the performance of the computing device over time and represents a recovery of the computing device to the disturbance, and wherein the generated performance data comprises a performance measurement of the computing device at a time before the disturbance and a performance measurement at each of a plurality of times after the disturbance.

Example 23 is a non-transitory machine-readable storage medium of example 19, wherein the operations further comprise evaluating each of a plurality of candidate configurations after being applied to the computing device, wherein the plurality of candidate configurations comprises a candidate configuration that generates a load on the computing device;

Example 24 is a non-transitory machine-readable storage medium of example 19, wherein the operations further comprise calibrating the configuration of the computing device in view of the performance measurement of the target computing device.

Example 25 is a non-transitory machine-readable storage medium of example 19, wherein the operations further comprise: receiving state data that represents a configuration and a performance of a production environment that comprises the target device; and configuring a test environment that comprises the computing device to emulate the performance of the production environment, wherein the configuring is based on the received state data of the production environment.

Example 26 is a non-transitory machine-readable storage medium of example 19, wherein the performance measurement of the target computing device comprise one or more of a duration, latency, or rate for processing incoming requests or outgoing responses.

Example 27 is a non-transitory machine-readable storage medium of example 19, wherein the operations further comprise selecting the configuration of the computing device that emulates the target computing device of the production environment.

Example 28 is a system comprising: a memory; and a processing device communicably coupled to the memory, the processing device to: monitor a performance of a target computing device in a production environment, wherein the monitoring generates a performance measurement for the target computing device; configure a computing device to adjust a performance of the computing device to correspond to the performance measurement of the target computing device; introduce a disturbance to the computing device; determine a performance of the computing device at a time after the introducing the disturbance; and generate performance data indicating an effect the disturbance has on the computing device.

Example 29 is a system of example 28, wherein the target computing device comprises a set of computing devices in the production environment and the computing device comprises a set of computing devices in a test environment, and wherein updating the configuration comprises updating a configuration of the set of computing devices to emulate a performance of the set of target computing devices while experiencing a production load.

Example 30 is a device comprising: a means for accessing, by a processing device, state data of a target computing device that is in a production environment, the state data comprising a performance measurement of a target computing device; a means for updating a configuration of a computing device to adjust a performance of the computing device to correspond to the performance measurement of the target computing device; a means for introducing, by the processing device, a disturbance to the computing device; a means for determining, by the processing device, a performance of the computing device at a time after the introducing the disturbance; and a means for generating performance data indicating an effect the disturbance has on the computing device.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 400 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    accessing, by a processing device, state data of a target computing device residing in a production environment, the state data comprising a performance measurement of the target computing device;
    updating, in a test environment that is separate from the production environment, a configuration of a computing device residing in the test environment to adjust a performance of the computing device to correspond to the performance measurement of the target computing device residing in the production environment;
    introducing, by the processing device, a disturbance to the computing device;
    determining, by the processing device, a performance of the computing device at a time after the introducing the disturbance; and
    generating performance data indicating an effect the disturbance has on the computing device.

2. The method of claim 1, wherein the target computing device comprises a set of computing devices in the production environment and the computing device comprises a set of computing devices in the test environment, and wherein updating the configuration comprises updating a configuration of the set of computing devices in the test environment to emulate a performance of the set of target computing devices in the production environment while experiencing a production load.

3. The method of claim 1, wherein introducing the disturbance comprises at least one of terminating a process, disabling a network connection, deactivating a processor, decreasing a memory capacity, causing a storage drive failure, decreasing network bandwidth, increasing network latency, increasing memory latency.

4. The method of claim 1, wherein the generated performance data represents the performance of the computing device over time and represents a recovery of the computing device to the disturbance, and wherein the generated performance data comprises a performance measurement of the computing device at a time before the disturbance and a performance measurement at each of a plurality of times after the disturbance.

5. The method of claim 1, further comprising evaluating each of a plurality of candidate configurations after being applied to the computing device, wherein the plurality of candidate configurations comprises a candidate configuration that generates a load on the computing device.

6. The method of claim 1, further comprising calibrating the configuration of the computing device in view of the performance measurement of the target computing device, wherein the calibrating comprises:
    updating the computing device to comprise a first candidate configuration;
    evaluating the first candidate configuration in view of the performance measurement of the target computing device;
    modify, based on the evaluating, the first candidate configuration to create a second candidate configuration; and
    determining the second candidate configuration causes the computing device to comprise a performance measurement that is substantially similar to the performance measurement of the target computing device.

7. The method of claim 1, further comprising:
    receiving state data of the production environment that comprises the target computing device, wherein the state data represents a configuration and a performance of the production environment; and
    configuring the test environment that comprises the computing device to emulate the performance of the production environment, wherein the configuring is based on the received state data of the production environment.

8. The method of claim 1, wherein the performance measurement of the target computing device comprise one or more of a duration, latency, or rate for processing incoming requests or outgoing responses.

9. The method of claim 1, further comprising selecting the configuration of the computing device that emulates the target computing device of the production environment, wherein the selecting comprises:
    determining the target computing device of the production environment uses remote computing resources; and
    configuring local computing resources of the computing device to degrade performance and emulate the performance of the target computing device using the remote computing resources.

10. A system comprising:
    a memory; and
    a processing device communicably coupled to the memory, the processing device to:
        access state data of a target computing device residing in a production environment, the state data comprising a performance measurement of the target computing device;
        update, in a test environment that is separate from the production environment, a configuration of a computing device residing in the test environment to adjust a performance of the computing device to correspond to the performance measurement of the target computing device residing in the production environment;

introduce a disturbance to the computing device;

determine a performance of the computing device at a time after the introducing the disturbance; and generate performance data indicating an effect the disturbance has on the computing device.

11. The system of claim 10, wherein the target computing device comprises a set of computing devices in the production environment and the computing device comprises a set of computing devices in the test environment, and wherein to update the configuration the processing device is to configure the set of computing devices in the test environment to emulate a performance of the set of target computing devices in the production while experiencing a production load.

12. The system of claim 10, wherein to introduce the disturbance, the processing device is to perform at least one of: terminating a process, disabling a network connection, deactivating a processor, decreasing a memory capacity, causing a storage drive failure, decreasing network bandwidth, increasing network latency, or increasing memory latency.

13. The system of claim 10, wherein the performance data represents the performance of the computing device over time and represents a recovery of the computing device to the disturbance, and wherein the performance data comprises a performance measurement of the computing device at a time before the disturbance and a performance measurement at each of a plurality of times after the disturbance.

14. The system of claim 10, wherein the processing device is further to evaluate each of a plurality of candidate configurations after being applied to the computing device, wherein the plurality of candidate configurations comprises a candidate configuration that generates a load on the computing device.

15. The system of claim 10, wherein the processing device is further to calibrate the configuration of the computing device in view of the performance measurement of the target computing device.

16. The system of claim 10, wherein the processing device is further to:

receive state data that represents a configuration and a performance of a production environment that comprises the target computing device; and configure the test environment that comprises the computing device to emulate the performance of the production environment, wherein the configuring is based on the received state data of the production environment.

17. The system of claim 10, wherein the performance measurement of the target computing device comprises one or more of a duration, latency, or rate for processing incoming requests or outgoing responses.

18. The system of claim 10, wherein the processing device is further to:

determine the target computing device of the production environment uses remote computing resources; and configure local computing resources of the computing device to degrade performance and emulate the performance of the target computing device using the remote computing resources.

19. A non-transitory machine-readable storage medium storing instructions which, when executed, cause a processing device to perform operations comprising:

monitoring a performance of a target computing device residing in a production environment, wherein the monitoring generates a performance measurement for the target computing device;

configuring, in a test environment that is separate from the production environment, computing device residing in the test environment to adjust a performance of the computing device to correspond to the performance measurement of the target computing device residing in the production environment;

introducing a disturbance to the computing device;

determining a performance of the computing device at a time after the introducing the disturbance; and generating performance data indicating an effect the disturbance has on the computing device.

20. The non-transitory machine-readable storage medium of claim 19, wherein the target computing device comprises a set of computing devices in the production environment and the computing device comprises a set of computing devices in the test environment, and wherein updating the configuration comprises updating a configuration of the set of computing devices in the test environment to emulate a performance of the set of target computing devices in the production environment while experiencing a production load.

* * * * *